(12) United States Patent
Cwalina et al.

(10) Patent No.: US 7,430,732 B2
(45) Date of Patent: Sep. 30, 2008

(54) DESIGN OF APPLICATION PROGRAMMING INTERFACES (APIS)

(75) Inventors: Krzysztof J. Cwalina, Redmond, WA (US); Bradley Moore Abrams, Kirkland, WA (US); Anthony J. Moore, Seattle, WA (US); Christopher L. Anderson, Issaquah, WA (US); Michael Pizzo, Bellevue, WA (US); Robert Allan Brigham, II, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 774 days.

(21) Appl. No.: 10/692,320

(22) Filed: Oct. 23, 2003

(65) Prior Publication Data

US 2005/0091660 A1 Apr. 28, 2005

(51) Int. Cl.
G06F 9/44 (2006.01)
G06F 3/00 (2006.01)
(52) U.S. Cl. .................... 717/126; 717/107; 717/124; 719/328
(58) Field of Classification Search ......... 717/106–113, 717/124–135; 719/328–329
See application file for complete search history.

(56) References Cited

U.S. PATENT DOCUMENTS

| | | | |
|---|---|---|---|
| 5,097,533 A * | 3/1992 | Burger et al. | 719/328 |
| 5,495,571 A * | 2/1996 | Corrie et al. | 714/38 |
| 5,623,663 A * | 4/1997 | Morgan et al. | 718/100 |
| 5,987,247 A | 11/1999 | Lau | |
| 6,006,279 A * | 12/1999 | Hayes | 719/328 |
| 6,253,257 B1 * | 6/2001 | Dundon | 719/331 |
| 6,651,186 B1 * | 11/2003 | Schwabe | 714/38 |
| 6,842,892 B1 * | 1/2005 | Goldberg et al. | 717/108 |
| 6,848,110 B2 * | 1/2005 | Salmon | 719/328 |
| 6,883,163 B1 * | 4/2005 | Schwabe | 717/126 |
| 6,981,245 B1 * | 12/2005 | Schwabe | 717/126 |
| 6,983,468 B1 * | 1/2006 | Green et al. | 719/331 |

(Continued)

FOREIGN PATENT DOCUMENTS

WO WO0188702 11/2001

OTHER PUBLICATIONS

Morelli et al., "A Java API for Historical Ciphers: An Object-Oriented Design Project," 2001, ACM, p. 307-311.*

(Continued)

Primary Examiner—Wei Y. Zhen
Assistant Examiner—Qing Chen
(74) Attorney, Agent, or Firm—Lee & Hayes, PLLC

(57) ABSTRACT

A first exemplary method implementation for designing an application programming interface (API) includes: preparing multiple code samples for a core scenario, each respective code sample of the multiple code samples corresponding to a respective programming language of multiple programming languages; and deriving the API from the core scenario responsive to the multiple code samples. A second exemplary method for designing an API includes: selecting a core scenario for a feature area; writing at least one code sample for the core scenario; and deriving an API for the core scenario responsive to the at least one code sample. A third exemplary method for designing an API includes: deriving an API for a scenario responsive to at least one code sample written with regard to the scenario; performing one or more usability studies on the API utilizing multiple developers; and revising the API based on the one or more usability studies.

48 Claims, 10 Drawing Sheets

U.S. PATENT DOCUMENTS

| | | | |
|---|---|---|---|
| 6,986,132 B1 * | 1/2006 | Schwabe | 717/168 |
| 6,993,773 B2 * | 1/2006 | Broussard | 719/328 |
| 7,158,993 B1 * | 1/2007 | Schwabe | 707/103 R |
| 7,191,452 B2 * | 3/2007 | Noden | 719/328 |
| 2001/0052111 A1 | 12/2001 | Scott | |
| 2002/0083212 A1 | 6/2002 | Salmon | |
| 2002/0184409 A1 * | 12/2002 | Broussard | 709/328 |
| 2004/0148612 A1 * | 7/2004 | Olsen | 719/328 |
| 2004/0233236 A1 * | 11/2004 | Yang | 345/763 |
| 2005/0246644 A1 * | 11/2005 | Broussard | 715/746 |

OTHER PUBLICATIONS

Venners, Bill, "Joshua Bloch: A conversation about design," 2002, Java World <http://www.javaworld.com/javaworld/jw-01-2002/jw-0104-bloch_p.html>, p. 1-4.*

"Design principles for authoring dynamic, reusable learning objects", Boyle, T., Australian Journal of Educational Technology, 2003, vol. 19, No. 1, pp. 46-58.

"On implementing a high-performance open API with Java". Ghosale et al., Bell Labs Technical Journal, 2003, vol. 7, No. 4, pp. 123-138.

Abrams, "Design Guidelines", available at <<http:web.archive.org/web/20030811093701/http://blogs.gotdotnet.com/brada/CategoryView.aspx/DesignGuidelines>>, archived on Aug. 11, 2003, 33 pages.

Brunschen, "Post on the Usenet comp.lang.objective-c", Aug. 8, 2003, availabe at <<http://groups.google.com.au/group/comp.lang.objective-c/msg/eed52bf85a16783e>>, 2 pages.

Clarke, "Describing and Evaluating API Usability at Microsoft", available at <<http://web.archive.org/web/20031008171804/http://www.gotdotnet.com/learn/brada/describingandevaluatingapiusabilityatmicrosoft.ppt>>, archived on Oct. 8, 2003, pp. 1-25.

McLellan, et al., "Building more Usable API's", May-Jun. 1998, Software IEEE, vol. 15, No. 3, pp. 78-86.

* cited by examiner

DESIGN OF APPLICATION PROGRAMMING INTERFACES (APIS)

TECHNICAL FIELD

This disclosure relates in general to application programming interfaces (APIs) and in particular, by way of example but not limitation, to designing APIs that are easy to use while simultaneously providing control and flexibility.

BACKGROUND

Application programming interfaces (APIs) are used by developers to create a wide variety of applications and programs. Developers range from office workers recording macros to low-level device driver authors. These developers rely on different languages and/or different frameworks of differing complexities while programming with different skill sets and/or for different purposes. Traditionally, different APIs have been designed to target different individual levels of skill and different demands for control (e.g., based on different relevant scenarios).

Although this approach can be successful in providing APIs that are optimized for a specific developer, it has significant drawbacks. For example, the multiple framework approach creates situations where developers have difficulty transferring knowledge from one skill level and scenario type to another. When there is a need for them to implement a scenario using a different framework, developers hit a very steep learning curve. And not only is the learning curve very steep, but it generally requires that the code written to a first lower-skill-level framework has to be rewritten from scratch to a second higher-skill-level framework. Moreover, the creation of separate frameworks for different developer skill levels typically results in a situation in which APIs that are targeted for or implemented by one level of developer are unusable by another level of developer.

FIG. 1 illustrates a graph 101 of a traditional API learning curve with regard to two different frameworks. The first framework corresponds to a framework that has a relatively lower level of required skills and/or difficulty and a concomitantly relatively lower capacity for control by a developer. The second framework, on the other hand, corresponds to a framework that has a relatively higher level of required skills and/or difficulty and a concomitantly relatively higher capacity for control by a developer. Such a first framework might be used by a novice or infrequent developer, and such a second framework might be used by an experienced or professional developer. For example, the first framework may correspond to one designed for Visual Basic, and the second framework may correspond to one designed for C++.

In this traditional approach, relatively separate and disparate APIs are designed and employed as part of each framework. A steep but relatively short learning curve is traversed to enable API usage for the first framework at the relatively lower skill level and control capability. Because of the separate and disparate nature of the two API frameworks, the experience with the first framework contributes little if any knowledge toward learning the second API of the second framework. Consequently, an equally steep but even taller learning curve is traversed to enable API usage for the second framework.

In other words, learning an API of the first framework does not provide a stepping stone to learning an API of the second framework. The regressive nature of this disjointed set of API frameworks is indicated by the continuity gap. A developer who has learned the API of the first framework is no closer to learning the API of the second framework and must therefore start with the basics of the second framework.

Another problem with traditional frameworks is that they tend to have an overall poor usability in any case. In general, object oriented design/development (OOD) methodologies (e.g. unified modeling language (UML)) are "optimized" for maintainability of the resulting design and not for usability of the resulting frameworks. OOD methodologies are better suited for internal architecture designs and less suited for designs of an API layer of a large reusable library. For example, poor usability can result from OOD methodologies that focus only on distillation to a lowest fundamental block and/or that have an unwavering allegiance to a strict inheritance hierarchy throughout an API design.

Accordingly, there is a need for schemes and/or techniques that can at least ameliorate the regressive continuity gap of a traditional API learning curve and/or that can deliver better overall API usability.

SUMMARY

In a first exemplary method implementation, a method for designing an application programming interface (API) includes: preparing multiple code samples for a core scenario, each respective code sample of the multiple code samples corresponding to a respective programming language of multiple programming languages; and deriving the API from the core scenario responsive to the multiple code samples. In a second exemplary method implementation, a method for designing an API includes: selecting a core scenario for a feature area; writing at least one code sample for the core scenario; and deriving an API for the core scenario responsive to the at least one code sample. In a third exemplary method implementation, a method for designing an API includes: deriving an API for a scenario responsive to at least one code sample written with regard to the scenario; performing one or more usability studies on the API utilizing multiple developers; and revising the API based on the one or more usability studies.

Other method, system, approach, apparatus, device, media, API, procedure, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Figure 1:
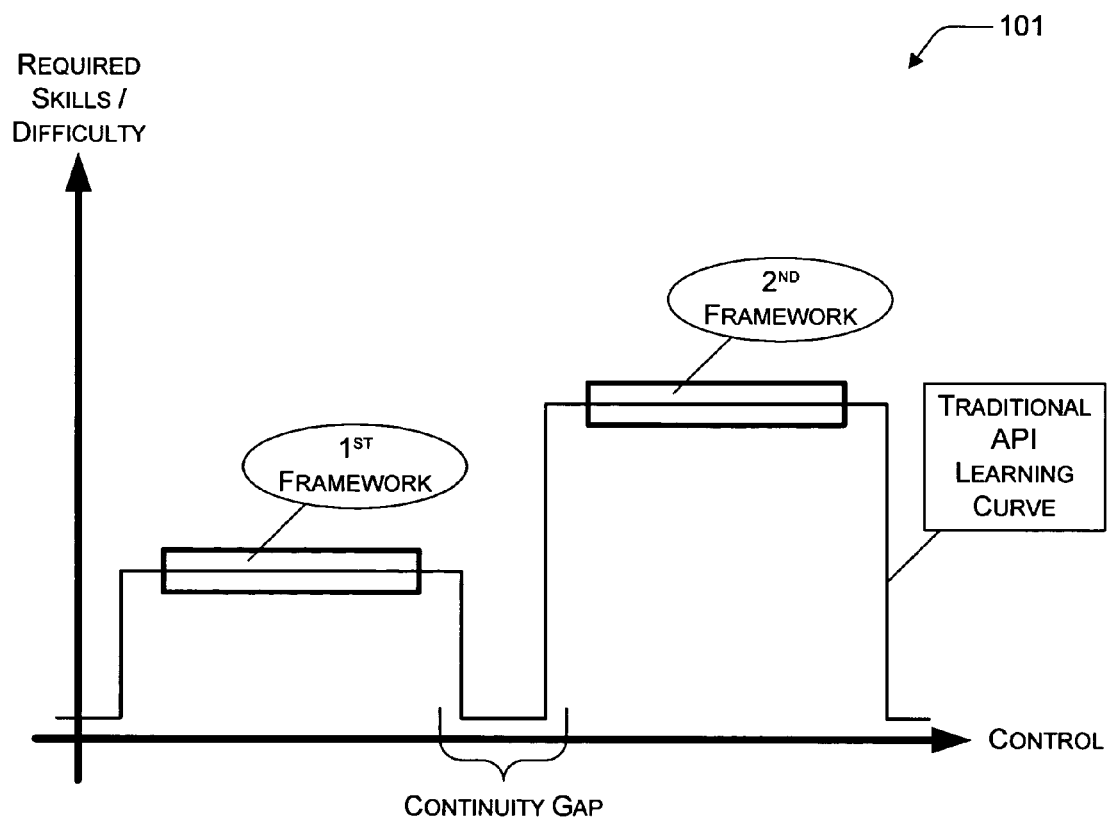
FIG. 1 illustrates a graph of a traditional API learning curve with regard to two different frameworks.
Figure 2:
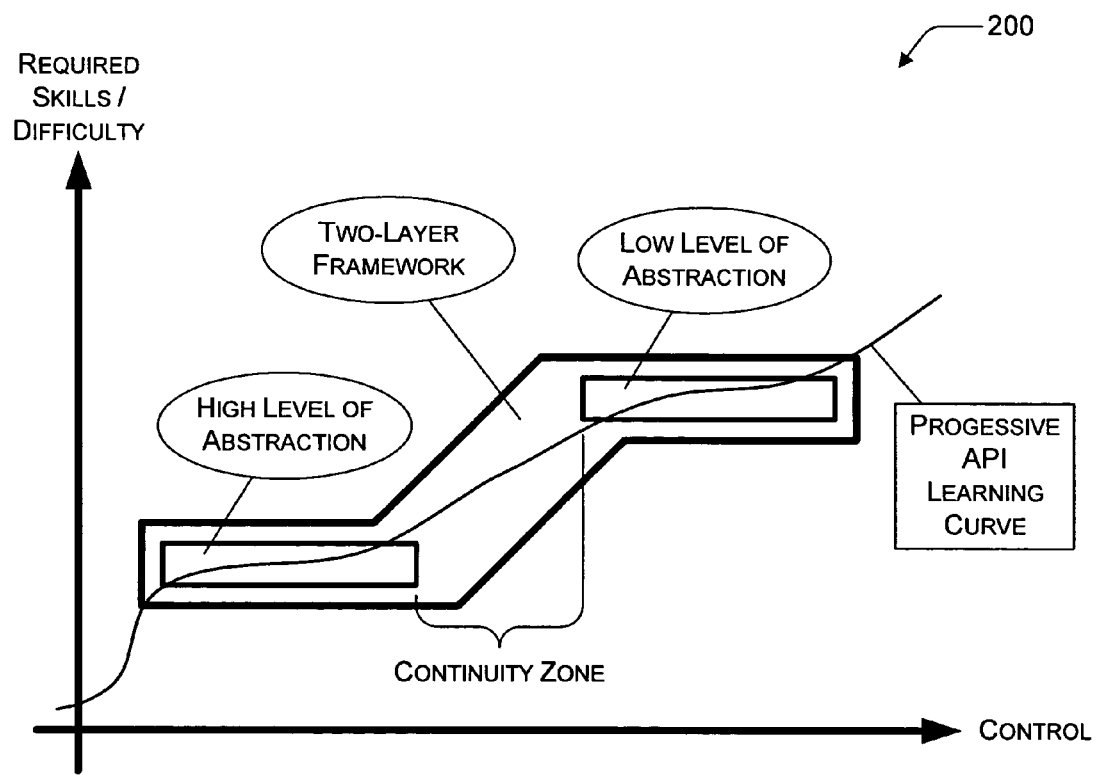
FIG. 2 illustrates a graph of an exemplary progressive API learning curve with regard to two different levels of abstraction.

FIG. 2 illustrates a graph 200 of an exemplary progressive API learning curve with regard to two different levels of abstraction. The two different illustrated levels of abstraction are a relatively high level of abstraction and a relatively low level of abstraction. The high level of abstraction corresponds to a development environment that involves a relatively lower level of required skills and/or difficulty and a concomitantly relatively lower capacity for control by a developer. The low level of abstraction, on the other hand, corresponds to a development environment that involves a relatively higher level of required skills and/or difficulty and a concomitantly relatively higher capacity for control by a developer.

A progressive API learning curve is shown rising from a point of lower required skills and concomitant control capability in a relatively smooth manner through the areas for the high and low levels of abstraction to a point of higher required skills and concomitant control capability. The progressive API learning curve exhibits a continuity zone between the areas of the high level of abstraction and the low level of abstraction. An integrated API framework enables a gradual learning curve. Because of the integrated nature of the API framework, experience with the high level of abstraction contributes to knowledge toward learning API usage for the low level of abstraction as well as for scenarios demanding greater control.

In other words, learning the API for higher levels of abstraction provides a stepping stone to learning and/or extending the API into lower levels of abstraction. This is indicated by the two-layer (API) framework shape encompassing both the high and the low level of abstraction areas. The progressive nature of certain APIs, as described herein below, enable developers to use simple APIs initially and to gradually (and partially) begin using more complicated API components. Thus, developers who have learned the APIs targeting the higher levels of abstraction can move to using the APIs targeting the lower levels of abstraction as their experience warrants and/or as the complexity of the scenarios that they are facing demand.

A progressive API can be easily usable (especially during early learning phases) and highly powerful (especially as the API is explored over time). A usable API may include one or more of the following exemplary attributes: a small number of concepts and/or classes are required to get started, a few lines of code can implement simple scenarios, classes/methods have intuitive names, a natural and/or obvious starting point is apparent, and there is a clear (e.g., discoverable) progression to additional required and/or relevant concepts/classes.

A progressive API can also enable an incremental advancement from developing at a point of lower difficulty and concomitant control capability to a point of higher difficulty and concomitant control capability. Exemplary paradigms for designing progressive APIs, as well as generally highly usable APIs, are described herein below.

Figure 3:
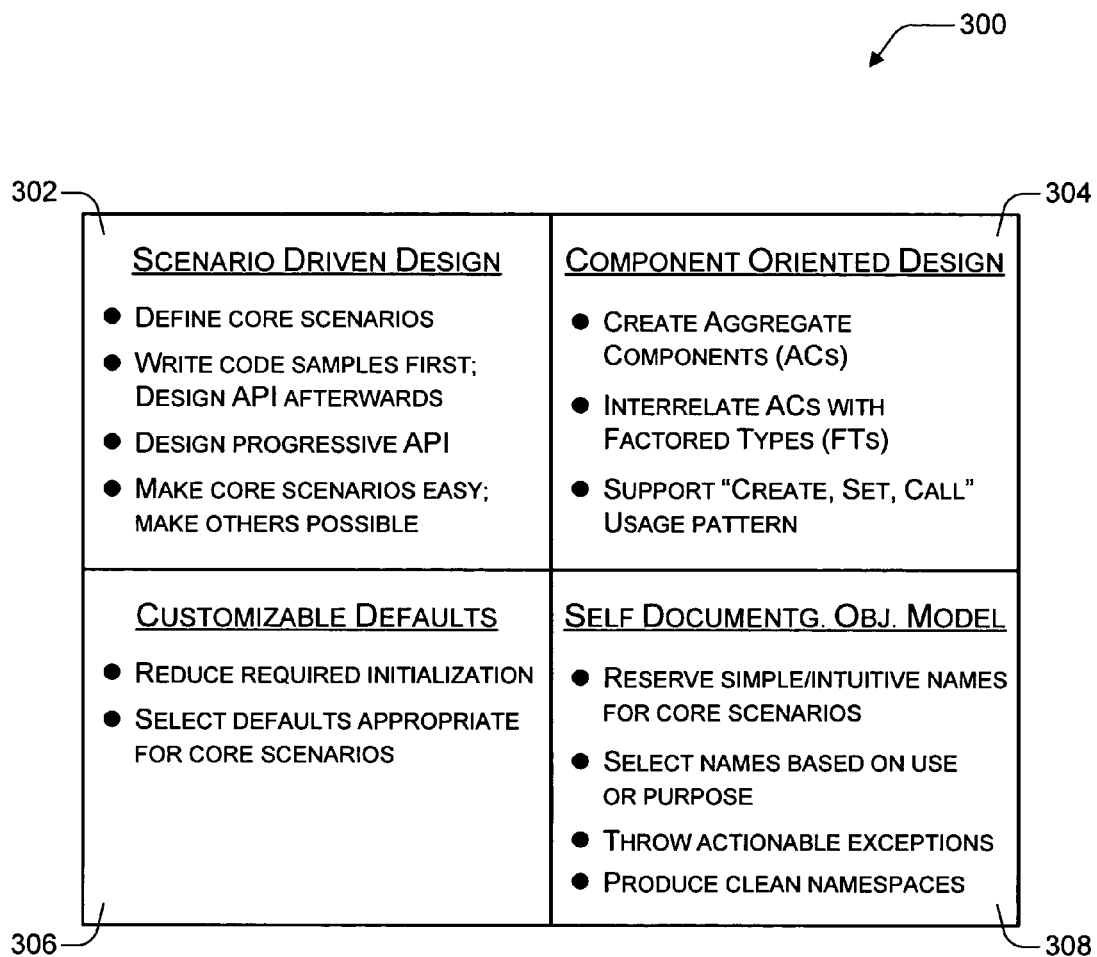
FIG. 3 illustrates exemplary design principles and practices for APIs.

FIG. 3 illustrates exemplary design principles and practices for APIs in a table 300. Table 300 indicates general design principles and practices for four exemplary categories 302-308. Specifically, the following four categories are addressed: scenario driven design 302, component oriented design 304, customizable defaults 306, and self documenting object model 308.

When designing a given API, the design principles and practices for any one or more of the indicated categories 302-308 may be employed. Furthermore, within any given category 302-308, one or more of the illustrated design principles and practices may be implemented. In other words, neither every category nor every design principle and practice thereof need be employed or implemented for a given API design.

Scenario driven design category 302 illustrates four exemplary design principles and practices. Firstly, core scenarios for selected features or technological areas are defined. Secondly, code samples corresponding to the core scenarios are written first, and the API is designed responsive thereto second. Thirdly, a progressive API, as introduced above and described further herein below, is designed. Fourthly, utilizing the defined core scenarios is made easy while utilizing other scenarios is made possible. Scenario driven design 302 is described further below in the section entitled "Scenario Driven Design".

Component oriented design category 304 illustrates three exemplary design principles and practices. Firstly, aggregate components (ACs) are created. Generally, aggregate components are directed toward core scenarios, are relatively simple and easy to use, and are built on top of factored types (FTs). Factored types are more fundamental and are decomposed to lower logical levels. This results in a two-layer API design. Secondly, these aggregate components are interrelated with the factored types. Thirdly, a create-set-call usage pattern is supported, especially for aggregate components. Component oriented design 304 is described further below in the section entitled "Component Oriented Design".

Customizable defaults category 306 illustrates two exemplary design principles and practices. Firstly, required initializations to use at least aggregate components are reduced. Defaults are used to reduce required initializations. Secondly, defaults are selected that are appropriate for the defined core scenarios. Customizable defaults 306 is described further below in the section entitled "Customizable Defaults".

Self documenting object model category 308 illustrates four exemplary design principles and practices. Firstly, simple and intuitive names are reserved for core scenarios. Secondly, names are selected based on the intended use or purpose of the component type, instead of a hidebound adherence to the inheritance hierarchy. Thirdly, actionable exceptions are thrown so that a developer receives instructions indicating how to fix an error from the exception message. Fourthly, clean namespaces are produced by placing types that are rarely used into sub-namespaces to avoid cluttering the main namespaces. Self documenting object model 308 is described further below in the section entitled "Self Documenting Object Model".

Scenario Driven Design

In a described implementation, API specifications are driven by scenarios. Accordingly, API designers first write the code that the users of the API will have to write in core (e.g., main) scenarios. API designers then design an object model to support these code samples. This approach contrasts with starting a design of an object model (using various design methodologies) and then writing code samples based on the resulting API.

In other words, especially for public API design, API designers start with a list of scenarios for each feature or technology area and code samples therefor and produce a header-style object model description based thereon. Examples of feature areas include: file I/O, networking, messaging, console, diagnostics, database access, web pages, graphical user interface (GUI) programming, and so forth.

Figure 4:
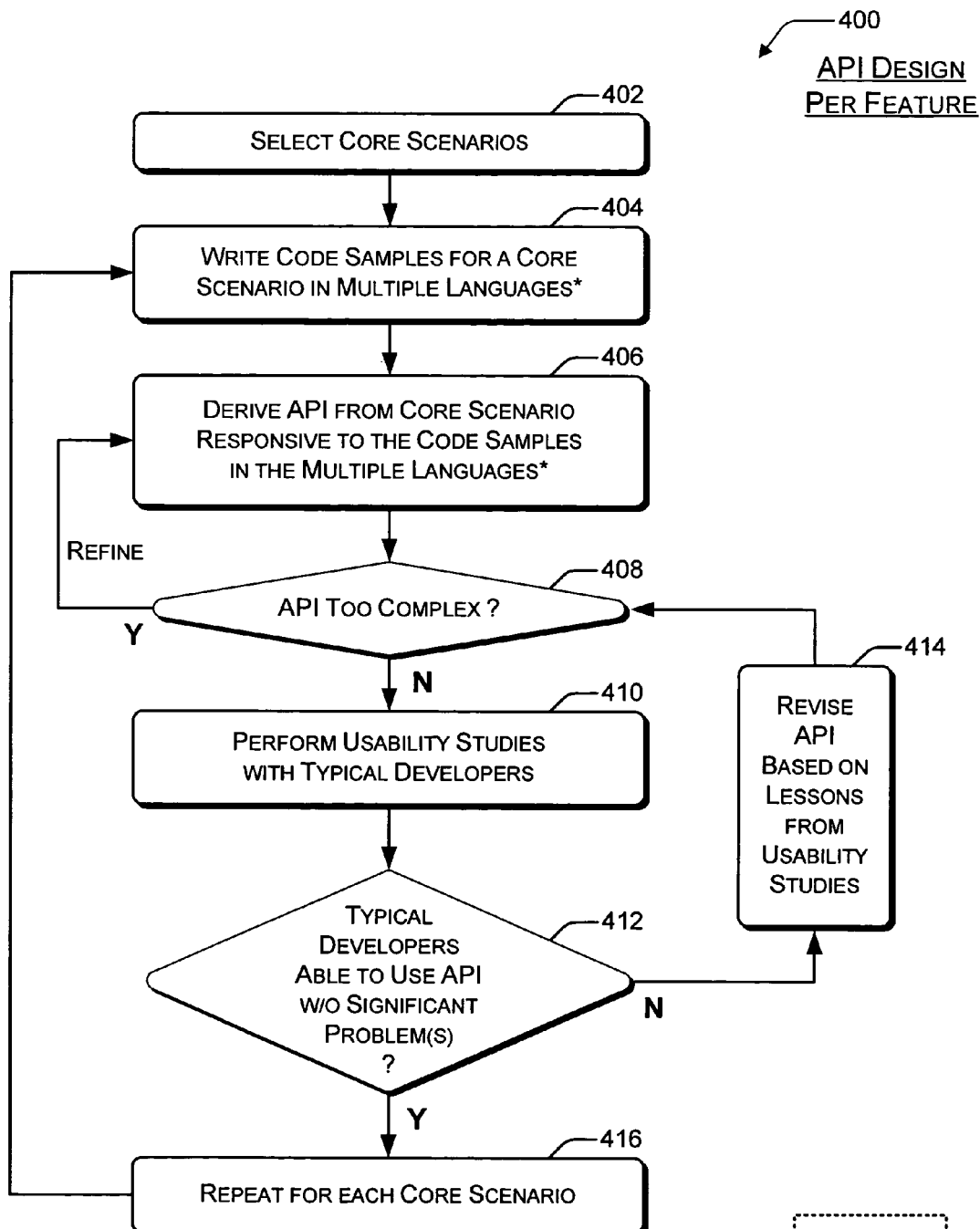
FIG. 4 is a flow diagram that illustrates an exemplary technique for designing APIs per feature area.

FIG. 4 is a flow diagram 400 that illustrates an exemplary technique for designing APIs per feature area. At block 402, core scenarios are selected for the given feature area. For example, for a given technology area, the top 5-10 scenarios may be selected. They may be selected based on the most commonly used functions (e.g., most common tasks) or the most frequently pursued goals for the given technology area. For instance, exemplary scenarios for a file I/O technology feature area are reading from a file and writing to a file.

At block 404, code samples for a core scenario are written in multiple (e.g., two or more) languages. For example, code samples associated with a selected core scenario may be written in three different languages. The code samples may implement the current selected core scenario in the three languages. Such languages include, for example, VB, C#, MC++, a markup language, and so forth; however, other languages may also be used. As indicated by the asterisk, it should be understood that a code sample (or even more than one code sample) may be written for the core scenario in a single language when designing a usable and powerful API for a single language.

Writing code samples in multiple languages may be performed because sometimes code written in different languages differs significantly. In a described implementation, the code samples for the current selected core scenario are written using different coding styles that are common among users of the particular language (e.g., using language-specific features or traits, using the practices/habits of developers, etc.) in which a particular code sample is written. For example, the samples may be written using language-specific casing. For instance, VB is case-insensitive, so code samples written in VB reflect that variability. Code samples written in C#, on the other hand, follow the standard casing therefor.

Another example relates to a statement called "using", which C# supports. For instance, the "using" call encapsulates a try/finally block. However, VB does not support this feature, and writing code samples can indicate that utilizing this feature in a try/finally statement is awkward for VB users. Yet another example relates to assignments in a conditional clause, which C# supports. In a file I/O instance: "if ((text=reader.ReadLine( )!=null)" works in C#. However, the assignment statement cannot be used within the "if" clause in VB; instead, the code is broken into multiple statements. Still yet another example relates to the tendency of C# developers to utilize parameterized constructors while VB developers usually do not. For instance, a C# coding may be "MyClass x=new MyClass("value")" while a corresponding VB coding is "Dimx As MyClass" and "x.Property="value"."

At block 406, an API is derived from the current core scenario responsive to the code samples written in the multiple languages. For example, factors gleaned from the code samples written in each of the multiple languages may be incorporated into the API. Such factors may include similarities across the different code samples, differences between/among two or more code samples, and so forth. Such factors, as well as other aspects of blocks 404 and 406, are described further below with reference to FIG. 5.

Similarly, when designing an API for a single language, the API is derived from the current core scenario responsive to the code sample(s) written in the single language. Thus, factors gleaned from the code sample(s) written in the single language may be incorporated into the API. As an additional API design factor example for single or multiple language situations, an API design factor may include compatibility with tools that are oriented toward the language or languages for which the code sample(s) are written.

At block 408, it is determined if the API is too complex. For example, the API may be reviewed by the API designer(s) to determine if the API is or is not too complex. In other words, an initial check may be performed to consider whether the API can be used without significant understanding of multiple other specific APIs, without undue experimentation, and so forth. Such an initial check may also verify that the derived API is actually workable in the current core scenario in every relevant language. If the API is too complex, then the API is refined by the designers with reference to the current core scenario and responsive 19 to the code samples written in the multiple languages at block 406.

If, on the other hand, it is determined that the API is not too complex (at block 408), then at block 410 usability studies with typical developers are performed. For example, one or more usability studies may be performed using a development environment akin to that which the typical developer normally uses. Such a normal development environment likely includes intellisense, editors, language, and a documentation set that is most widely used by the targeted developer group.

Usability Studies

Usability studies that target a wide range of developers facilitate scenario-driven design, especially when designing general public APIs. The code samples written by the API designer(s) for the core scenarios probably appear simple to them, but the code samples might not be equally simple to certain groups of developers that are in fact targeted (e.g., especially novice and/or occasional developers). Additionally, the understanding, which is garnered through usability studies, regarding the manner in which developers approach each core scenario can provide powerful insight into the design of the API and how well it meets the needs of all of the targeted developers.

Generally, usability studies may be conducted early in the product cycle and again after any major redesign of the object model. Although this is a costly design practice, it can actually save resources in the long run. The cost of fixing an unusable or merely defective API without introducing breaking changes is enormous.

At block 412, it is ascertained whether typical developers are able to use the API without significant problem(s). For example, most subjects should be able to write code for the current selected scenario without major problems. If they cannot, the API is revised (as described below with reference to block 414).

The interpretation of significant/major problems hinges on a desired level of usability for a given targeted developer group. For example, frequent and/or extensive reference to detailed API documentation for the current core scenario by test subjects may constitute significant problems. Generally, if the majority of test developers cannot implement the current core scenario, or if the approach they take is significantly different from what was expected, the API should be evaluated for possible revisions (up to and including a full redesign).

If it is ascertained that typical developers are unable to use the API without major problems (at block 412), then at block 414 the API is revised based on lessons from the usability studies. For example, a default may be changed, another property may be added, one or more attributes may be exposed instead of encapsulated, and so forth.

If, on the other hand, it is ascertained that typical developers are able to use the API without major problems (at block 412), then at block 416 the process is repeated for each core scenario. For example, another core scenario of the selected core scenarios for the given feature becomes the current core scenario for which code samples are written (at block 404). Another exemplary technique for designing APIs, which focuses more on two-layer API design, is described further below in conjunction with FIG. 8.

Figure 5:
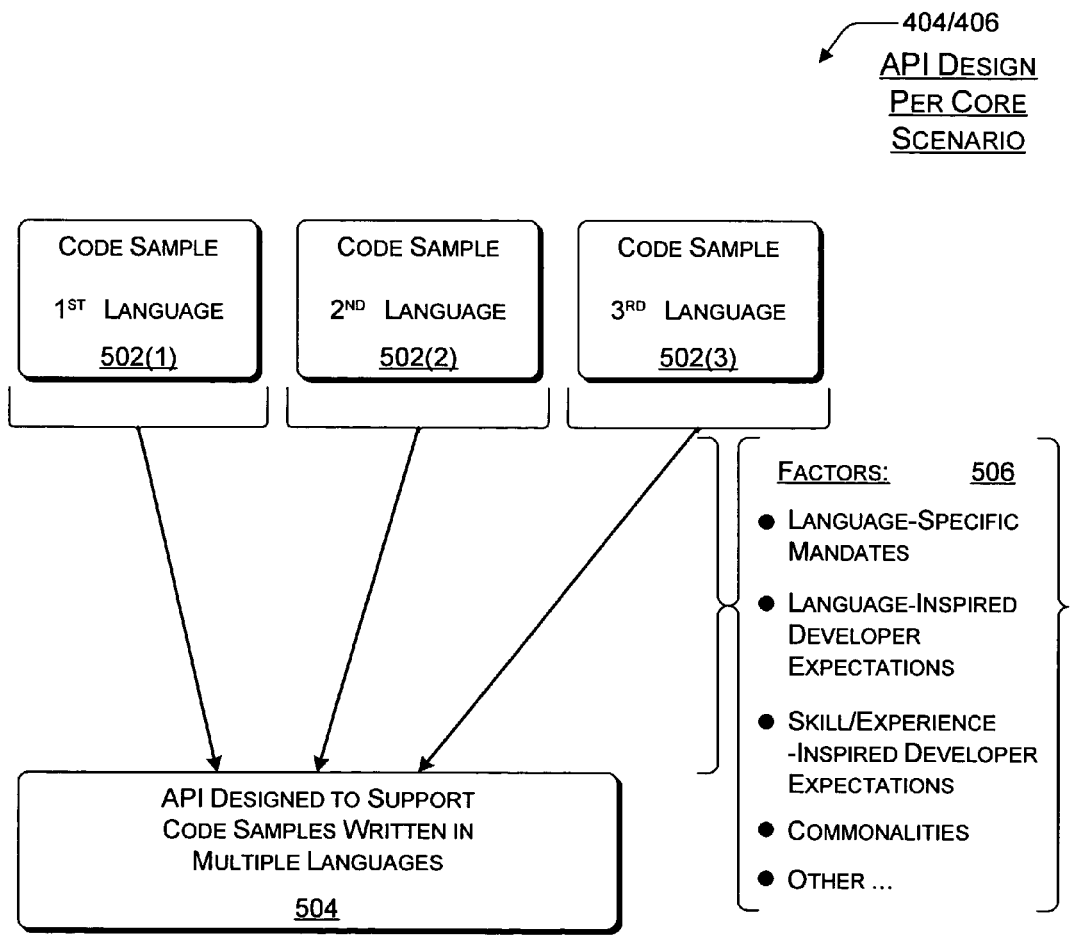
FIG. 5 is a block diagram that illustrates an exemplary scheme for designing APIs per core scenario.

FIG. 5 is a block diagram 404/406 that illustrates an exemplary scheme for designing APIs per core scenario. The illustrated exemplary scheme corresponds to blocks 404 and 406 of FIG. 4 for a multiple language implementation. A code sample 502(1) for a first language, a code sample 502(2) for a second language, and a code sample 502(3) for a third language is shown. Each of the three code samples 502(1, 2, 3) are directed to a given current core scenario. Although three code samples 502(1, 2, 3) corresponding to three languages are shown, two or more code samples 502 of any arbitrary number of targeted languages may alternatively be used in this exemplary multiple-language implementation.

In a described implementation, factors 506 are gleaned from code samples 502(1, 2, 3) that are written in each of the three languages. These factors 506 are incorporated into the API 504. Specifically, API 504 is designed to support the three code samples 502(1, 2, 3) that are written in the three respective corresponding languages. However, it should be understood that factors 506 may also be applicable to single-language implementations. Some exemplary factors 506 are described above with reference to blocks 404 and 406 of FIG. 4, and other exemplary factors 506 are indicated in block diagram 404/406 of FIG. 5. Such factors 506 include language-specific mandates that are revealed by a review of code samples 502(1, 2, 3). An example of a language-specific constraint is described with regard to the following sample line of code: "Foo f=new Foo( );". A progressive API that is designed to support this sample line has to include a default constructor; otherwise, the code sample does not compile correctly. Factors 506 also include developer expectations that are inspired by both language peculiarities and the different skill/experience levels of typical developers that naturally gravitate toward the different languages. Factors 506 further include commonalities of code and coding practices across the different languages as discoverable by a review of code samples 502(1, 2, 3).

While considering factors 506 that directly relate to different languages, other factors 506, as described herein, continue to be considered. For example, the following factors 506 are also pertinent to progressive APIs targeted to single-language environments as well as multiple-language environments. First, the number of different component types that are required to complete a scenario is a factor. Generally, the more component types that are required, the harder it is to learn. A second factor is the connection between succeeding lines of code. To the extent that usage of one component type leads a developer towards usage of the next required component type, the easier the API is to use.

Third, consistency in the naming of identifiers is another factor. A fourth factor involves the appropriate usage of properties, methods, and events. A fifth factor relates to possible similarities to one or more existing APIs. Sixth, another factor involves compliance with overall design guidelines for an API. A seventh factor relates to whether the APIs overlap with other component types of the framework. Eighth, compatibility with tools that are oriented toward a particular language is yet another factor. For instance, VB developers typically want parameter-less constructors and property setters. Other factors 506 may alternatively be considered.

Still other factors 506 that relate to interrelationships of aggregate components and factored types are described below, especially with reference to FIG. 8. Although the method and scheme of FIGS. 4 and 5 may be applied to designing APIs in general, they are particularly applicable to designing two-layer APIs. A two-layer API paradigm (e.g., with aggregate components and factored types) is described below with reference to FIGS. 6-8 in the section entitled "Component Oriented Design".

Component Oriented Design

Figure 6:
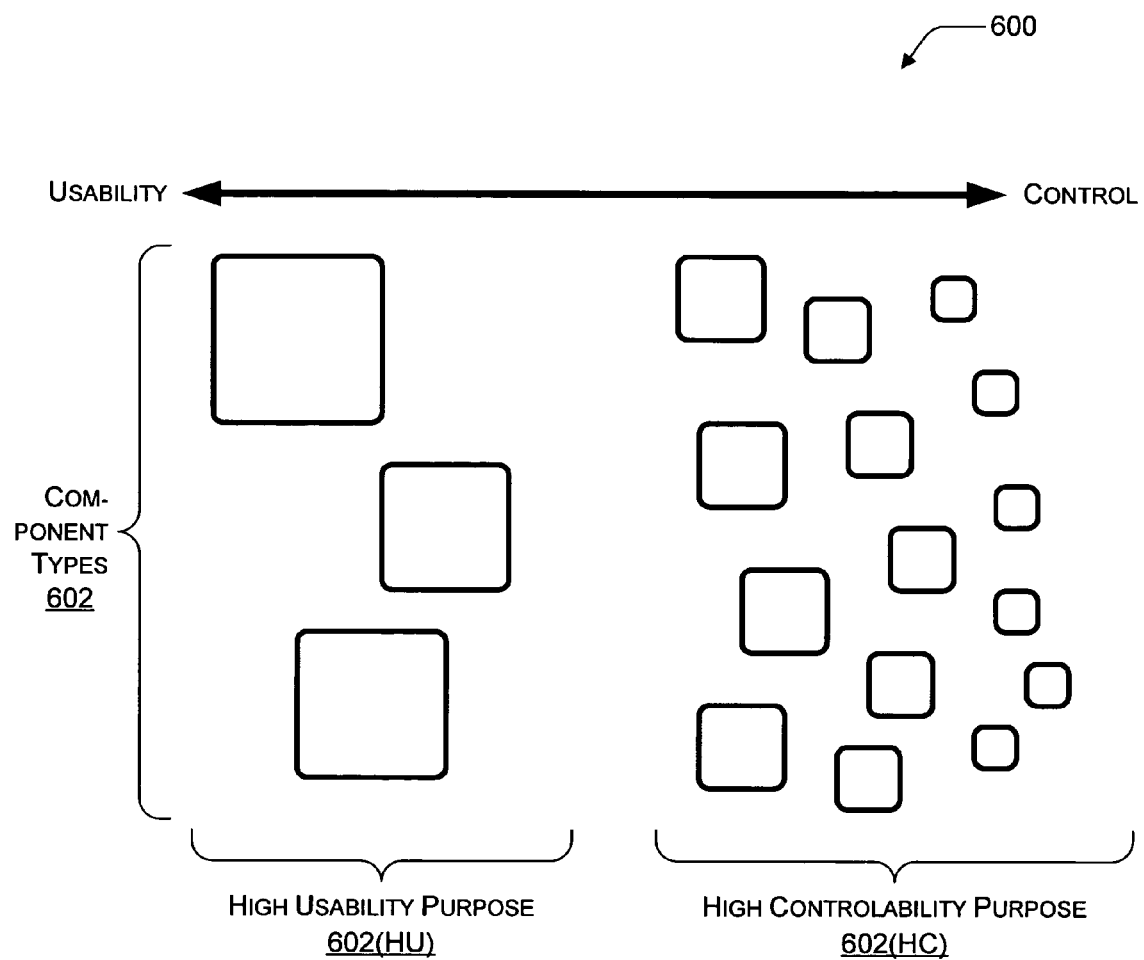
FIG. 6 illustrates potential disparity between exemplary component types that are targeted to two different purposes.

FIG. 6 illustrates potential disparity between exemplary component types 602 that are targeted to two different purposes along a continuum 600. Continuum 600 extends from a high usability range on the left side to a high controllability range on the right side. Multiple component types 602 are spread across continuum 600.

Generally, component types 602 that are illustrated as being relatively larger represent types that are simpler and therefore easier to use. Conversely, component types 602 that are illustrated as being relatively smaller represent types that are more complex and therefore more difficult to use. Simple and complex in this context refer to how easy or how difficult the particular component types 602 are to use when implementing a specified scenario.

The component types 602 that are illustrated as being relatively smaller are generally more difficult to use for a number of exemplary reasons as follows: First, developers have more choices as to which component types 602 they should use. In the illustrated example, there are 14 "choices" for the smaller component types 602 as compared to three "choices" for the larger component types 602. More specifically, a developer has to know or discern, from among the various component types 602(HC), which component type or types to use. This involves understanding each of the (e.g., 14) multiple component types 602(HC) as well as how they interrelate, which contrasts with starting with a single component type 602(HU) from among the fewer (e.g., 3) component types 602(HU). Differences between component types 602(HU) and component types 602(HC) are described further below.

By way of an exemplary analogy, the smaller component types 602 are like the individual components of a stereo system; hence, a user has to know which components are needed and how to hook them together. Without hooking them together, they are generally not useful. The larger component types 602 are like all-in-one stereos that are easily usable but likely to be less powerful as well as less flexible. A second reason that smaller component types 602 are harder to use is that there are potentially more "starting points". Third, there are generally more concepts to understand. Fourth, a developer has to understand how individual components types 602 relate to other component types 602.

In a described implementation, component types 602 are divided into those with a high usability purpose 602(HU) and those with a high controllability purpose 602(HC). High usability component types 602(HU) are simpler and easier to use, but they tend to be more inflexible, limiting, and/or constraining. They can generally be used without extensive knowledge of an overall API. High usability component types 602(HU) are usually capable of implementing a limited number of scenarios or at most a limited number of approaches to each scenario of interest.

High controllability component types 602(HC), on the other hand, are complex to use, but they provide a greater degree of control to developers. They are relatively powerful and enable developers to effectuate low-level tweaking and tuning. However, developing with high controllability component types 602(HC) entails a fuller understanding of many component types 602 to enable the instantiation of multiple high controllability component types 602(HC) that are correctly interlinked to implement even relatively straight-forward scenarios.

Typically, high usability component types 602(HU) are present in introductory languages such as VB, and high controllability component types 602(HC) are present in advanced professional-programmer-type languages such as C++. The potential disparity between high usability component types 602(HU) and high controllability component types 602(HC) that is illustrated in FIG. 6 is at least partly ameliorated by component types 702 of FIG. 7. Specifically, an interrelationship between high usability component types 602(HU) and high controllability component types 602(HC) is established by a progressive API.

Figure 7:
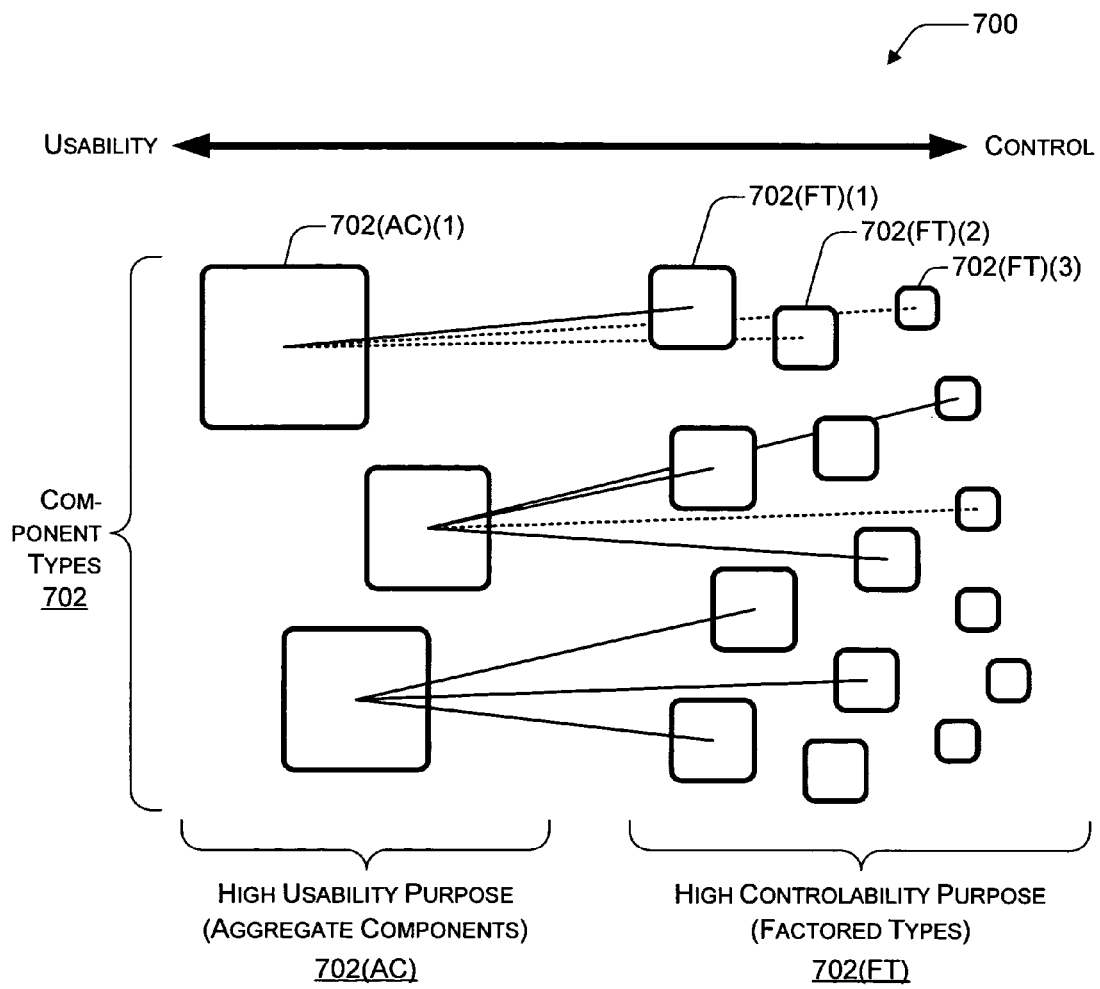
FIG. 7 illustrates an exemplary relationship between component types that are designed to be extensible and/or interoperable so as to cover two different purposes.

FIG. 7 illustrates an exemplary relationship between component types 702 that are designed to be extensible and/or interoperable so as to cover at least two different purposes along a continuum 700. In a described implementation, component types with a high usability purpose are realized as aggregate components 702(AC), and component types with a high controllability purpose are realized as factored types 702(FT). Although component types 702 are divided into only two purposes, they may alternatively be separated into three or more purposes (or other categories).

A key 704 indicates that a solid line represents a relationship for exposed factored types and that a dashed line represents a relationship for encapsulated factored types. As illustrated, aggregate component 702(AC)(1) has a relationship with three factored types 702(FT). Specifically, factored type 702(FT)(1) has an exposed factored type relationship with aggregate component 702(AC)(1), and factored types 702 (FT)(2) and 702(FT)(3) have an encapsulated factored type relationship with aggregate component 702(AC)(1).

Although not so illustrated, two or more aggregate components 702(AC) may have an encapsulated and/or exposed relationship with the same factored type 702(FT). Exposed and encapsulated factored types 702(FT) and aggregate components 702(AC), as well as relationships therebetween, are described further below, including with reference to FIG. 8.

Component oriented design relates to offering a single object per user concept as opposed to requiring multiple objects per logical concept. Aggregate components therefore usually correspond to a user concept and are simpler from a usability perspective. Aggregate components are layered on top of factored types. By way of an exemplary comparison, aggregate components may model a thing such as a file, and factored types may model a state of a thing such as a view on the file. Together, aggregate components and factored types provide a progressive and gradual learning curve for new developers, especially with respect to a particular given API.

Component Oriented Design for Aggregate Components

Many feature areas may benefit from facade types that act as simplified views over a more complex but well-factored remainder of the feature area APIs. In a described implementation, the facade covers the top 5-10 scenarios in a given feature area and optionally other high-level operations. Aggregate components 702(AC) can serve as such facade types, and factored types 702(FT) can provide a remaining well-factored complex API landscape.

Each aggregate component ties multiple lower level factored classes into a higher-level component to support the top core scenarios. For example, a mail aggregate component may tie together SMTP protocol, sockets, encodings, and so forth. Generally, each aggregate component provides a higher abstraction level rather than just a different way of doing things. Providing simplified high-level operations is helpful for those developers who do not want to learn the whole extent of the functionality provided by a feature area and merely wish to accomplish their often very simple tasks without significant study or API exploration.

Generally, component oriented design is a design based on constructors, properties, methods, and events. Using aggregate components is a relatively extreme application of component oriented design. An exemplary set of parameters for component oriented design of aggregate components is provided below:

Constructors: aggregate components have default (parameter-less) constructors.

Constructors: optional constructor parameters correspond to properties.

Properties: most properties have getters and setters.

Properties: properties have sensible defaults.

Methods: methods do not take parameters if the parameters specify options that stay constant across method calls (in the selected core scenarios). Such options may be specified using properties.

Events: methods do not take delegates as parameters. Callbacks are implemented in terms of events.

Component oriented design entails considering how the API is used instead of focusing on the mere inclusions of the methods, properties, and events in the object model. An exemplary usage model for component oriented design involves a pattern of instantiating a type with a default or relatively simple constructor, setting some properties on the instance, and then calling simple methods. This pattern is termed a Create-Set-Call usage pattern. A general example follows:

```
' VB
' Instantiate
Dim T As New T( )
' Set properties/options.
T.P1 = V1
T.P2 = V2
T.P3 = V3
' Call methods; optionally change options between calls.
T.M1( )
T.P3 = V4
T.M2( )
```

When aggregate components support this Create-Set-Call usage pattern, the aggregate components comport with the expectations of the main users of aggregate components. Moreover, tools, such as intellisense and designers, are optimized for this usage pattern. A concrete code example showing the Create-Set-Call usage pattern follows:

```
' VB
' Instantiate
Dim File As New FileObject( )
' Set properties.
File.Filename = "c:\foo.txt"
File.Encoding = Encoding.Ascii
' Call methods.
File.Open(OpenMode.Write)
File.WriteLine("Hello World")
File.Close( )
```

With an exemplary aggregate component that is part of a progressive API, setting the "File.Encoding" property is optional. The APT has a default for a pre-selected file encoding if one is not specified. Similarly, with regard to "File.Open( )", specifying an "OpenMode.Write" is optional. If it is not specified, a default "OpenMode" as pre-selected by the API is employed.

An issue with component oriented design is that it results in types that can have modes and invalid states. For example, a default constructor allows users to instantiate a "FileObject" without specifying a "FileName". Attempting to call Open() without first setting the "FileName" results in an exception because the "FileObject" is in an invalid state with respect to being opened (e.g., no file name has yet been specified). Another issue is that properties, which can be set optionally and independently, do not enforce consistent and atomic changes to the state of the object. Furthermore, such "modal" properties inhibit sharing of an object instance between consumers because a first user has to check a previously-set value before reusing it in case a second user has changed the value in the interim. However, the usability of aggregate components outweighs these issues for a vast multitude of developers.

When users call methods that are not valid in the current state of the object, an "InvalidOperationException" is thrown. The exception's message can clearly explain what properties need to be changed to get the object into a valid state. These clear exception messages partially overcome the invalid state issue and result in an object model that is more self-documenting.

API designers often try to design types such that objects cannot exist in an invalid state. This is accomplished, for example, by having all required settings as parameters to the constructor, by having get-only properties for settings that cannot be changed after instantiation, and by breaking functionality into separate types so that properties and methods do not overlap. In a described implementation, this approach is employed with factored types but not with aggregate components. For aggregate components, developers are offered clear exceptions that communicate invalid states to them. These clear exceptions can be thrown when an operation is being performed, instead of when the component is initialized (e.g., when a constructor is called or when a property is set), so as to avoid situations where the invalid state is temporary and gets "fixed" in a subsequent line of code.

Factored Types

As described above, aggregate components provide shortcuts for most common high level operations and are usually implemented as a facade over a set of more complex but also richer types, which are called factored types. In a described implementation, factored types do not have modes and do have very clear lifetimes.

An aggregate component may provide access to its internal factored types through some properties and/or methods. Users access the internal factored types in relatively advanced scenarios or in scenarios where integration with different parts of the system is required. The ability to access factored type(s) that are being used by an aggregate component enables code that has been written using the aggregate component to incrementally add complexity for advanced scenarios, or integrate with other component types, without having to re-write code from the beginning with a focus on using the factored types.

The following example shows an exemplary aggregate component ("FileObject") exposing its exemplary internal factored type ("StreamWriter"):

```
'VB
Dim File As New FileObject("c:\foo.txt")
File.Open(OpenMode.Write)
File.WriteLine("Hello World")
AppendMessageToTheWorld(File.StreamWriter)
File.Close( )
...
Public Sub AppendMessageToTheWorld(ByVal Writer As StreamWriter)
...
End Sub
```

High Level Operations

In a described implementation, aggregate components, as the upper or higher level APIs (e.g., from a level of abstraction perspective), are implemented such that they appear to "magically" work without the user being aware of the sometimes complicated things happening underneath. For example, an "EventLog" aggregate component hides the fact that a log has both a read handle and a write handle, both of which are opened in order to use it. As far as a developer may be concerned, the aggregate component can be instantiated, properties can be set, and log events can be written without concern for the under-the-hood functioning.

In some situations, a bit more transparency may facilitate some task with the developer. An example is an operation in which the user takes an explicit action as a result of the operation. For instance, implicitly opening a file and then requiring the user to explicitly close it is probably taking the principle of "magically" working too far. Nevertheless, a diligent API designer may often be capable of designing clever solutions that hide even those complexities. For example, reading a file can be implemented as a single operation that opens a file, reads its contents, and closes it; the user is thus shielded from the complexities related to opening and closing the file handles.

Furthermore, using aggregate components does not involve implementing any interfaces, modifying any conFIG.uration files, and so forth. Instead, library designers can ship default implementations for interfaces that are declared. Moreover, conFIG.uration settings are optional and backed by sensible defaults.

Figure 8:
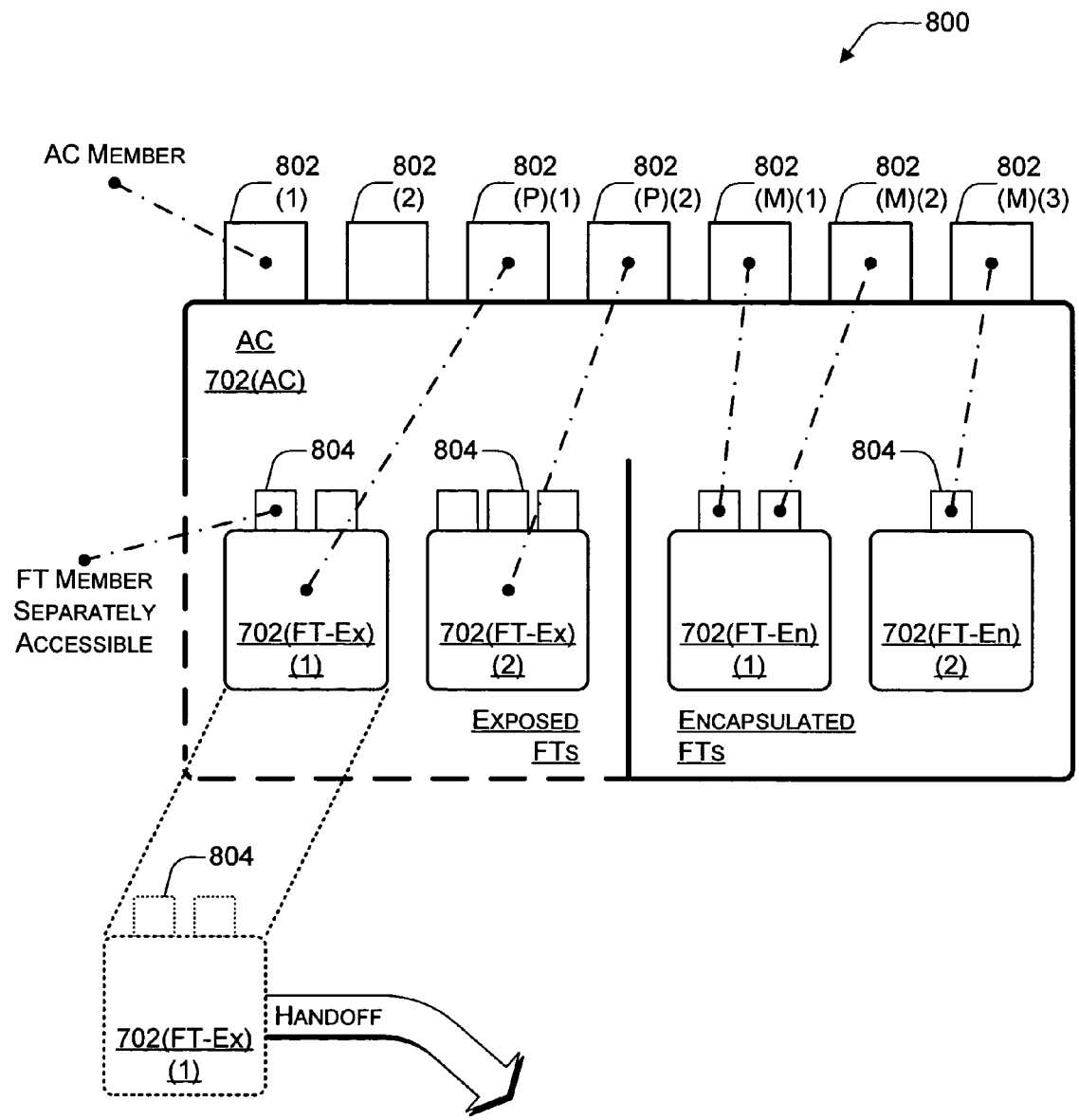
FIG. 8 illustrates an exemplary aggregate component (AC) and associated factored types (FTs) for handling two different purposes with a two-layer API.

FIG. 8 illustrates an exemplary aggregate component 702 (AC) and associated factored types 702(FT) for handling two different purposes with a two-layer API 800. Aggregate component 702(AC) represents a first or higher layer, and factored types 702(FT) represent a second or lower layer. The first layer effectively builds on the second layer with a custom interface.

As illustrated, aggregate component 702(AC) includes multiple aggregate component (AC) members 802. Specifically, aggregate component members 802(1), 802(2), 802(P) (1), 802(P)(2), 802(M)(1), 802(M)(2), and 802(M)(3) are shown. Aggregate component 702(AC) also includes exposed factored types 702(FT-Ex) and encapsulated factored types 702(FT-En). Specifically, exposed factored types 702(FT-Ex) (1) and 702(FT-Ex)(2) and encapsulated factored types 702 (FT-En)(1) and 702(FT-En)(2) are shown. Factored types 702 (FT) also include factored type (FT) members 804.

In a described implementation, aggregate component 702 (AC) includes at least one aggregate component member 802, which may be a method or a property for example. Aggregate component members 802 can therefore include aggregate component methods 802(M) and aggregate component properties 802(P). These aggregate component members 802, such as aggregate component members 802(1) and 802(2), may be specific to the aggregate component 702(AC). In other words, some aggregate component members 802 like aggregate component members 802(1) and 802(2) that are on aggregate component 702(AC) may not rely on any factored types 702(FT). Alternatively, some aggregate component members 802 may be linked to underlying factored types 702(FT).

Factored types 702(FT) may be exposed factored types 702(FT-Ex) or encapsulated factored types 702(FT-En). Exposed factored types 702(FT-Ex) are factored types 702 (FT) of a given aggregate component 702(AC) that may be accessible by or to other general component types 702(FT or AC) without using or going through individual aggregate component members 802 of the given aggregate component 702(AC). If a factored type 702(FT-Ex/En) is returned by an aggregate component member 802 (either a method or a property), then that factored type 702(FT-Ex) is exposed. Otherwise, that factored type 702(FT-En) is encapsulated.

In other words, an aggregate component member 802 can expose a factored type member 804, or an aggregate component member 802 can return a factored type instance. The latter can occur with exposed factored types 702(FT-Ex), and the former can occur with encapsulated factored types 702 (FT-En). Encapsulated factored types 702(FT-En) are factored types 702(FT) of a given aggregate component 702(AC) that are contained within or internal to the given aggregate component 702(AC). Each factored type 702(FT) may include one or more members 804 (some of which are specifically indicated in FIG. 8) that are methods and/or properties.

As illustrated, two method members 804 of encapsulated factored type 702(FT-En)(1) are exposed by aggregate component 702(AC) as method member 802(M)(1) and method member 802(M)(2). One method member 804 of encapsulated factored type 702(FT-En)(2) is exposed by aggregate component 702(AC) as method member 802(M)(3).

Exposed factored type 702(FT-Ex)(1) is itself exposed as a property member 802(P)(1) of aggregate component 702(AC). Similarly, exposed factored type 702(FT-Ex)(2) is also exposed as a property member 802(P)(2) of aggregate component 702(AC). As indicated, a factored type (FT) member 804 of exposed factored type 702(FT-Ex)(1) is exposed so as to be separately accessible (i.e., accessible without directly using an individual member 802 of aggregate component 702(AC)). Hence, a factored type member 804 of an exposed factored type 702(FT-Ex) can still be accessed even if it is not individually exposed by an aggregate component member 802 of aggregate component 702(AC).

Thus, the indicated member 804 of exposed factored type 702(FT-Ex)(1) is exposed so as to be accessible by component types 702 that are external to aggregate component 702 (AC) without using a member 802 thereof. As indicated by the dashed lines emanating from exposed factored type 702(FT-Ex)(1), exposed factored types 702(FT-Ex) may be "handed off" for use by other component types 702 (especially by other factored types 702(FT)) that are unable to interact with aggregate components 702(AC) or that can better achieve their intended purpose using the handed-off exposed factored type 702(FT-Ex)(1) alone. It should be noted that the object (exposed factored type 702(FT-Ex)(1)) that is "handed off" is not a copy but rather an actual part of the exposing aggregate component 702(AC). As a result, the operations on the handed off object affect aggregate component 702(AC).

Generally, if a factored type 702(FT) is encapsulated, it is not exposed to a consumer; instead, setting properties 802(P) or calling methods 802(M) on an aggregate component 702 (AC) may cause factored types 702(FT) to be created, properties 804 to be set, or methods 804 to be called on the underlying factored type 702(FT). These members 802 and 804 may not have a one-to-one correspondence; for example, setting several properties 802(P) on an aggregate component 702(AC) may be cached in the aggregate component 702 (AC). Subsequently calling a method 802(M) on the aggregate component 702(AC) may cause a factored type 702(FT) to be created using the previously-specified values of the several properties 802(P) as constructor arguments for the factored type 702(FT).

In a described implementation, aggregate components 702 (AC) differ from more-traditional object-oriented components in at least two ways in addition to the exposure of exposed factored types 702(FT-Ex). First, an aggregate component 702(AC) does not necessarily expose every member 804 of all of its factored types 702(FT). In other words, aggregate components 702(AC) are not strictly devoted to an inheritance hierarchy. Second, aggregate components 702 (AC) can have modes and thus may periodically have states that result in invalid operations.

As a guideline to component oriented design with respect to factors 506 (of FIG. 5), whether a factored type 702(FT) is exposed or encapsulated within an aggregate component 702 (AC) may be based on one or more of a number of factors. First, a particular factored type 702(FT) is exposed as a property member 802(P) of a given aggregate component 702 (AC) if the particular factored type 702(FT) includes functionality that is not exposed by the given aggregate component 702(AC). Second, a particular factored type 702 (FT) is exposed as a property member 802(P) of a given aggregate component 702(AC) if other general component types 702 of the framework may benefit from a handoff for direct consumption of the particular factored type 702(FT). On the other hand, a particular factored type 702(FT) is not exposed (and is therefore encapsulated) when functionality of the particular factored type 702(FT) is completely exposed by a given aggregate component 702(AC) and when the particular factored type 702(FT) is not useful for handing off to other component types 702.

A developer can start with aggregate component 702(AC), especially for implementing simpler and/or core scenarios. When the developer wishes or needs to implement a more complex scenario, the developer can incrementally and gradually begin to directly access and use exposed factored types 702(FT-Ex), including low-level attributes thereof, over time. The original code that relied on the simpler aggregate component 702(AC) does not need to be jettisoned and replaced with more complicated coding that relies solely on factored types 702(FT). The two-layers of the API framework can be used in varying proportions and can co-exist simultaneously.

Designing a two-layer API framework can be accomplished using the following exemplary technique that is described in ten phases: First, a set of core scenarios for a particular feature area is selected. Second, sample codes showing the preferred lines of code for the selected core scenarios are written. Third, aggregate components are derived with the appropriate methods, defaults, abstractions, naming, etc. to support the code samples from the lines of code.

Fourth, the code samples from the second phase are refined as appropriate according to the derived aggregate components. Fifth, the refined code samples are evaluated for whether or not they are sufficiently simple. If not, the technique continues again at the third phase. If so, then at the sixth phase it is determined whether additional scenarios, usages, interactions with other components, and/or other requirements exist. Seventh, the API designer decides if any of the additional requirements discovered in the sixth phase can be added to the aggregate components without adding undue complexity to the selected core scenarios.

Eighth, if the additional requirements cannot be added to the aggregate components, an ideal factoring (e.g., based on object-oriented or other analytical methodologies) of a full set of functionality for the factored types is defined based on the seventh phase. Ninth, it is determined how and whether the aggregate components encapsulate or expose the functionality from the factored types that are defined in the eighth phase. Tenth, the factored types are refined as appropriate to support the aggregate components as well as the additional requirements. Using this exemplary technique, a two-layer API framework having aggregate components 702(AC) and factored types 702(FT) may be designed.

Figure 9:
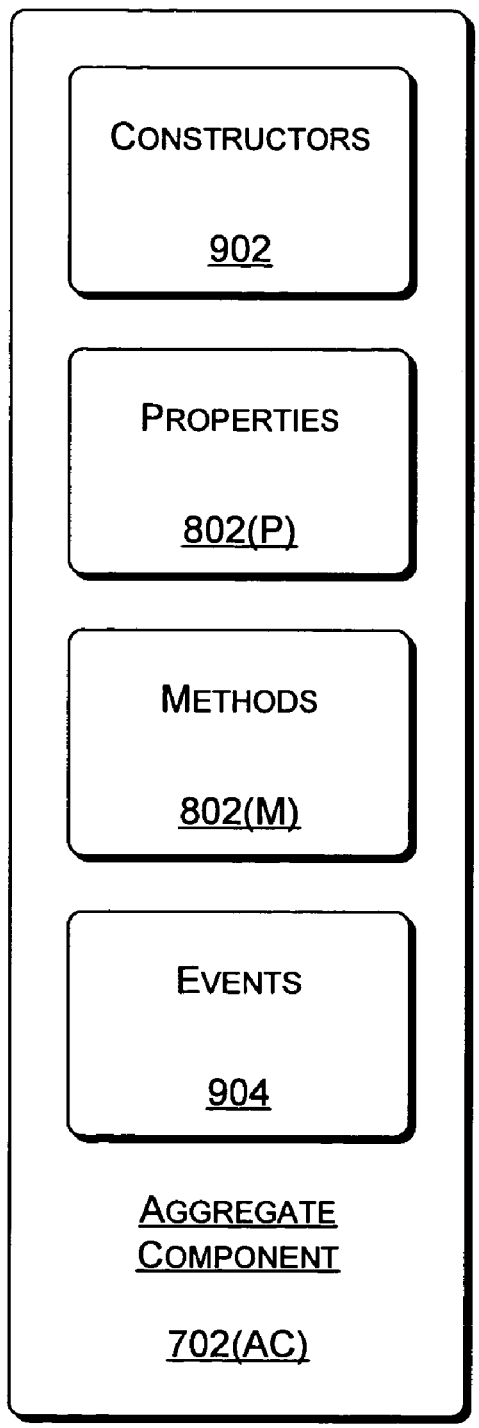
FIG. 9 illustrates an exemplary aggregate component and associated APIs that can support a create-set-call usage pattern.

FIG. 9 illustrates an exemplary aggregate component 702 (AC) and associated APIs 902, 802(P), 802(M), and 904 that can support a create-set-call usage pattern. The following exemplary API groups are illustrated: constructors 902, properties 802(P), methods 802(M), and events 904. With a create, set, call usage pattern, an instance of aggregate component 702(AC) is initially created by a developer with reliance on default (e.g., parameter-less) constructors 902.

Secondly, the developer sets any properties 802(P) for which the default values are inappropriate and/or non-preferred for the intended use of the object. Thirdly, desired methods 802(M) are called by the developer. Callbacks are then implemented in terms of events 904.

Customizable Defaults

Customizable defaults relates to having defaults whenever practicable for at least aggregate components. When designing an API for example with multiple code samples corresponding to multiple languages, an identical value that is passed in each of the code samples can instead be set as a default for the aggregate component. The customizable defaults may be changed by setting one or more properties on the aggregate component.

Many developers prefer to code by trial and error as opposed to taking the time to read the documentation and fully understand a feature area prior to beginning a project. This is particularly true for novice and occasional developers, such as those that code with VB. These developers often try to experiment with an API to discover what it does and how it works, and then they adjust their code slowly and incrementally until the API implementation achieves their goal. The popularity of the editing and continuing approach to development is a manifestation of this preference.

Some API designs lend themselves to "coding by experimentation" and some do not. There are multiple aspects that affect the level of success a developer is likely to have when using a coding by experimentation approach. These aspects include: (i) how easy it is to locate the right API for the task at hand; (ii) how easy it is to start using an API, regardless of whether it (initially) does what the developer wants it to do or not; (iii) how easy it is to discover what the points of customization are for an API; (iv) how easy it is to discover the correct customization for a given scenario; and (v) so forth.

In a described implementation, APIs are designed to require little if any initialization (e.g., a minimal amount of initialization). For example, an API can be designed so that a default constructor or a constructor with one simple parameter is sufficient to start working with a type. When initialization is necessary, an exception that results from not performing the initialization clearly explain what needs to be done and/or changed in order to remove or prevent the exception. For example, an exception may stipulate what or which property needs to be set.

By way of example but not limitation, a rule of thumb is that the simplest constructor has three or fewer parameters (with an upper limit of five). In addition, the simplest constructors should avoid complex types as any of the parameters, where complex types may be other factored types or aggregate components. Another rule of thumb is that the simplest constructors rely on primitive types like, enumerations, strings, integers, and so forth. Types may also implement more complex constructor overloads to support more complex scenarios.

In short, an API's customizability can be simplified by providing properties with good defaults for all customization points. (However, developers should generally be able to add new code to the existing code when customizing their scenarios; rewriting the entire code from scratch using a different API should be optional.) For example, a system messaging queue aggregate component enables the sending of messages after passing a path string to the constructor and calling a send method. Message properties, such as message priority and encryption algorithms, can be customized by adding code to the core scenario.

Self Documenting Object Model

Self documenting object model relates to designing an API framework in which a developer can look at objects and members thereof to learn about them as well as be able to use them. For example, names can be based on how a type is expected to be used instead of devotion to an inheritance hierarchy that many developers do not wish to study. In short, a self documenting object model facilitates discoverability by would-be developers.

As noted above, some developers prefer to code by trial and error and resort to reading documentation only when their intuition fails to implement their intended scenario. Thus, a self documenting object model should avoid requiring that developers read documentation every time they want to perform even simple tasks. An exemplary set of principles and practices to help in producing intuitive APIs that are relatively self documenting for a described implementation are presented below. Any one or more of them may be utilized in a given API and/or API design implementation.

Naming

A first guiding principle is to reserve simple and intuitive names for types that users need to use (e.g., instantiate) in the most common scenarios. Designers often "squander" the best names for abstractions, with which most users do not have to be concerned. For example, naming an abstract base class "File" and then providing a concrete type "XYZFile" works well if the expectation is that all users will have to understand the inheritance hierarchy before they can start using the APIs. However, if users do not understand the hierarchy, the first thing they will likely try to use, most often unsuccessfully, is the "File" type. More specifically, the most common or expected names are reserved for aggregate components targeting the top core scenarios with less common or familiar names being used on concepts and abstractions.

A second guiding principle is to use descriptive identifier names that clearly state what each method does and what each type and parameter represents. For example, API designers should not hesitate to be rather verbose when choosing identifier names. For instance, "EventLog.DeleteEventSource(string source, string machineName)" may be seen as rather verbose, but it arguably has a net positive usability value. Moreover, type and parameter names state what a type or a parameter represents, instead of what it does. Method names state what the method does. Of course, accurate verbose method names are easier for methods that have simple and clear semantics, which is another reason why avoiding complex semantics is a good general design principle to follow.

A guiding design practice is to include a discussion about naming choices as a significant part of API specification reviews and/or tests. Exemplary considerations and questions include: What are the types most scenarios start with? What are the names most people think of first when trying to implement a given scenario? Are the names of the common types what users think of first? For example, since "File" is the name most people think of when dealing with file I/O scenarios, the aggregate component for accessing files can be named "File". Additionally, the most commonly used methods of the most commonly used types and their parameters are reviewed and tested. For example, can anybody familiar with the technology, but not the specific API design under consideration, recognize and call those methods quickly, correctly, and easily?

Exceptions

As indicated above, exceptions can facilitate self-documenting APIs. In other words, APIs should lead the user to do the next required thing, and exceptions are capable of and good for communicating what is required next. For example, the following sample code throws an exception with a message "The 'FileName' property needs to be set before attempting to open the 'FileObject'.":

```
'VB
'Instantiate
Dim File As New FileObject( )
'The file name is not set.
File.Open( )
```

Strong Typing

Another guiding principle for facilitating intuitive APIs is strong typing. For example, calling "Customer.Name" is easier than calling "Customer.Properties['Name']". Furthermore, having such a "Name" property return the name as a string is more usable than if the property returned an object.

There are cases where property bags with a string based accessor, late bind calls, and other not strongly types APIs are desired, but they are relegated to rarity and are not the rule. Moreover, API designers can provide strongly typed helpers for the more common operations that the user performs on the non-strongly typed API layer. For example, a customer type may have a property bag, but it may additionally provide strongly typed APIs for more common properties like "name", "address", and so forth.

Vectoring Toward Simplicity

Yet another guiding principle is to strive for simplicity, especially for core scenarios. Standard design methodologies are aimed at producing designs that are optimized for maintainability, such as by using abstractions. Consequently, modern design methodologies produce a lot of abstractions. An issue is that such design methodologies operate on an assumption that users of the resulting designs will become experts in that design before starting to implement even simple scenarios. However, that is often not the cases in the real world.

In a described implementation, for at least simple scenarios, API designers ensure that object model hierarchies are sufficiently simple so that they can be used without having to understand how the entire feature area fits together or interoperates. A resulting well-designed API may require that the developer understand the core scenario being implemented, but it does not require a full understanding of the design of the library being used to implement it.

Generally, core scenario APIs are directed or correspond to physical or well-known logical parts of the system instead of abstractions. Types that correspond to abstractions are usually difficult to use without understanding how all the parts of the feature area fit together and interoperate; they are therefore more relevant when cross-feature integration is required.

Another guiding practice is to use standard design methodologies (e.g., UML) when designing internal architectures and some of the factored types, but not when designing the APIs for the core or common scenarios (e.g., those with aggregate components). When designing aggregate components for core scenarios, scenario driven design together with prototyping, usability studies, and iteration (as described herein above) is employed instead.

Clean Namespaces

Yet another guiding principle is that types that are (very) rarely used are placed in sub-namespaces to avoid clutter of the main namespaces. For example, the following two groups of types may be separated from their main namespaces: permission types and design types. For instance, permission types can reside in a ".Permissions" sub-namespace, and design-time-only types can reside in a ".Design" sub-namespace.

The actions, aspects, features, components, etc. of FIGS. 1-9 are illustrated in diagrams that are divided into multiple blocks. However, the order, interconnections, interrelationships, layout, etc. in which FIGS. 1-9 are described and/or shown is not intended to be construed as a limitation, and any number of the blocks can be modified, combined, rearranged, augmented, omitted, etc. in any manner to implement one or more systems, methods, devices, procedures, media, APIs, apparatuses, arrangements, etc. for designing APIs. Furthermore, although the description herein includes references to specific implementations (and the exemplary operating environment of FIG. 10), the illustrated and/or described implementations can be implemented in any suitable hardware, software, firmware, or combination thereof and using any suitable software architecture(s), coding language(s), scenario definitions(s), usability study format(s), and so forth.

Exemplary Operating Environment for Computer or Other Device

Figure 10:
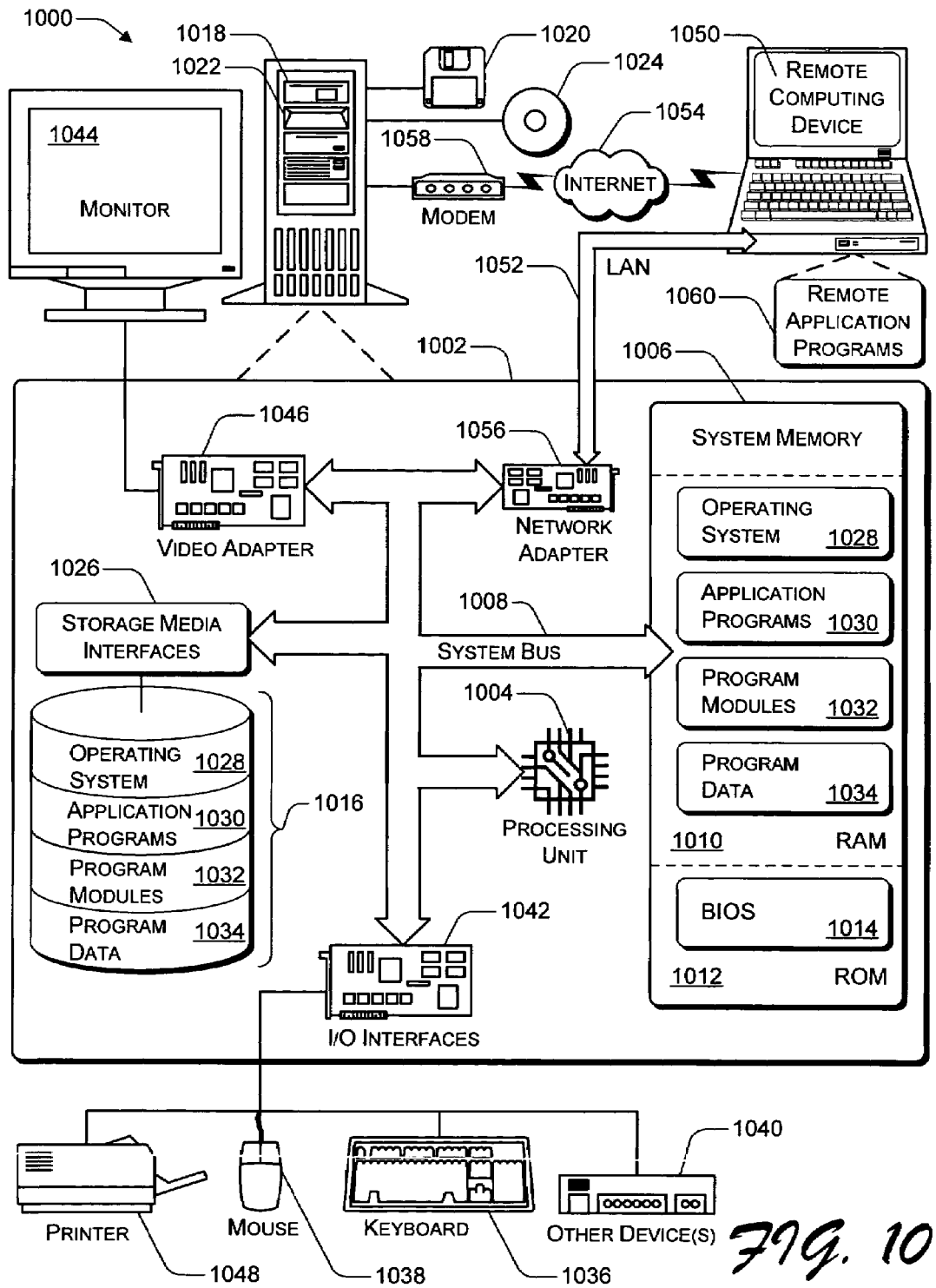
FIG. 10 illustrates an exemplary computing (or general device) operating environment that is capable of (wholly or partially) implementing at least one aspect of designing and/or using APIs as described herein.

FIG. 10 illustrates an exemplary computing (or general device) operating environment 1000 that is capable of (fully or partially) implementing at least one system, device, apparatus, component, arrangement, protocol, approach, method, procedure, media, API, some combination thereof, etc. for designing APIs as described herein. Operating environment 1000 may be utilized in the computer and network architectures described below.

Exemplary operating environment 1000 is only one example of an environment and is not intended to suggest any limitation as to the scope of use or functionality of the applicable device (including computer, network node, entertainment device, mobile appliance, general electronic device, etc.) architectures. Neither should operating environment 1000 (or the devices thereof) be interpreted as having any dependency or requirement relating to any one or to any combination of components as illustrated in FIG. 10.

Additionally, designing APIs and/or the APIs resulting therefrom may be implemented with numerous other general purpose or special purpose device (including computing system) environments or conFIG.urations. Examples of well known devices, systems, environments, and/or conFIG.urations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, minicomputers, mainframe computers, network nodes, distributed or multi-processing computing environments that include any of the above systems or devices, some combination thereof, and so forth.

Implementations for the design of APIs and/or the APIs resulting therefrom may be described in the general context of processor-executable instructions. Generally, processor-executable instructions include routines, programs, modules, protocols, objects, interfaces, components, data structures, etc. that perform and/or enable particular tasks and/or implement particular abstract data types. Designing APIs and/or the APIs resulting therefrom, as described in certain implementations herein, may also be practiced and/or present in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Exemplary operating environment 1000 includes a general-purpose computing device in the form of a computer 1002, which may comprise any (e.g., electronic) device with computing/processing capabilities. The components of computer 1002 may include, but are not limited to, one or more processors or processing units 1004, a system memory 1006, and a system bus 1008 that couples various system components including processor 1004 to system memory 1006.

Processors 1004 are not limited by the materials from which they are formed or the processing mechanisms employed therein. For example, processors 1004 may be comprised of semiconductor(s) and/or transistors (e.g., electronic integrated circuits (ICs)). In such a context, processor-executable instructions may be electronically-executable instructions. Alternatively, the mechanisms of or for processors 1004, and thus of or for computer 1002, may include, but are not limited to, quantum computing, optical computing, mechanical computing (e.g., using nanotechnology), and so forth.

System bus 1008 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 1002 typically includes a variety of processor-accessible media. Such media may be any available media that is accessible by computer 1002 or another (e.g., electronic) device, and it includes both volatile and non-volatile media, removable and non-removable media, and storage and transmission media.

System memory 1006 includes processor-accessible storage media in the form of volatile memory, such as random access memory (RAM) 1040, and/or non-volatile memory, such as read only memory (ROM) 1012. A basic input/output system (BIOS) 1014, containing the basic routines that help to transfer information between elements within computer 1002, such as during start-up, is typically stored in ROM 1012. RAM 1010 typically contains data and/or program modules/instructions that are immediately accessible to and/or being presently operated on by processing unit 1004.

Computer 1002 may also include other removable/non-removable and/or volatile/non-volatile storage media. By way of example, FIG. 10 illustrates a hard disk drive or disk drive array 1016 for reading from and writing to a (typically) non-removable, non-volatile magnetic media (not separately shown); a magnetic disk drive 1018 for reading from and writing to a (typically) removable, non-volatile magnetic disk 1020 (e.g., a "floppy disk"); and an optical disk drive 1022 for reading from and/or writing to a (typically) removable, non-volatile optical disk 1024 such as a CD, DVD, or other optical media. Hard disk drive 1016, magnetic disk drive 1018, and optical disk drive 1022 are each connected to system bus 1008 by one or more storage media interfaces 1026. Alternatively, hard disk drive 1016, magnetic disk drive 1018, and optical disk drive 1022 may be connected to system bus 1008 by one or more other separate or combined interfaces (not shown).

The disk drives and their associated processor-accessible media provide non-volatile storage of processor-executable instructions, such as data structures, program modules, and other data for computer 1002. Although exemplary computer 1002 illustrates a hard disk 1016, a removable magnetic disk 1020, and a removable optical disk 1024, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the exemplary operating environment 1000.

Any number of program modules (or other units or sets of instructions/code, including an API framework and/or objects based thereon) may be stored on hard disk 1016, magnetic disk 1020, optical disk 1024, ROM 1012, and/or RAM 1040, including by way of general example, an operating system 1028, one or more application programs 1030, other program modules 1032, and program data 1034.

A user may enter commands and/or information into computer 1002 via input devices such as a keyboard 1036 and a pointing device 1038 (e.g., a "mouse"). Other input devices 1040 (not shown specifically) may include a microphone, joystick, game pad, satellite dish, serial port, scanner, and/or the like. These and other input devices are connected to processing unit 1004 via input/output interfaces 1042 that are coupled to system bus 1008. However, input devices and/or output devices may instead be connected by other interface and bus structures, such as a parallel port, a game port, a universal serial bus (USB) port, an infrared port, an IEEE 1394 ("Firewire®") interface, an IEEE 802.11 wireless interface, a Bluetooth® wireless interface, and so forth.

A monitor/view screen 1044 or other type of display device may also be connected to system bus 1008 via an interface, such as a video adapter 1046. Video adapter 1046 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 1044, other output peripheral devices may include components such as speakers (not shown) and a printer 1048, which may be connected to computer 1002 via input/output interfaces 1042.

Computer 1002 may operate in a networked environment using logical connections to one or more remote computers, such as a remote computing device 1050. By way of example, remote computing device 1050 may be a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 1050 is illustrated as a portable computer that may include many or all of the elements and features described herein with respect to computer 1002.

Logical connections between computer 1002 and remote computer 1050 are depicted as a local area network (LAN) 1052 and a general wide area network (WAN) 1054. Such networking environments are commonplace in offices, enterprise-wide computer networks, intranets, the Internet, fixed and mobile telephone networks, ad-hoc and infrastructure wireless networks, other wireless networks, gaming networks, some combination thereof, and so forth. Such networks and communications connections are examples of transmission media.

When implemented in a LAN networking environment, computer 1002 is usually connected to LAN 1052 via a network interface or adapter 1056. When implemented in a WAN networking environment, computer 1002 typically includes a modem 1058 or other component for establishing communications over WAN 1054. Modem 1058, which may be internal or external to computer 1002, may be connected to system bus 1008 via input/output interfaces 1042 or any other appropriate mechanism(s). It is to be appreciated that the illustrated network connections are exemplary and that other manners for establishing communication link(s) between computers 1002 and 1050 may be employed.

In a networked environment, such as that illustrated with operating environment 1000, program modules or other instructions that are depicted relative to computer 1002, or portions thereof, may be fully or partially stored in a remote media storage device. By way of example, remote application programs 1060 reside on a memory component of remote computer 1050 but may be usable or otherwise accessible via computer 1002. Also, for purposes of illustration, application programs 1030 and other processor-executable instructions such as operating system 1028 are illustrated herein as discrete blocks, but it is recognized that such programs, components, and other instructions reside at various times in different storage components of computing device 1002 (and/or remote computing device 1050) and are executed by processor(s) 1004 of computer 1002 (and/or those of remote computing device 1050).

Although systems, media, devices, methods, procedures, apparatuses, techniques, APIs, schemes, approaches, procedures, arrangements, and other implementations have been described in language specific to structural, logical, algorithmic, functional, and action-based features and/or diagrams, it is to be understood that the invention defined in the appended claims is not necessarily limited to the specific features or diagrams described. Rather, the specific features and diagrams are disclosed as exemplary forms of implementing the claimed invention.

The invention claimed is:

1. A method for designing an Application Programming Interface (API), the method comprising:
   preparing a plurality of code samples for a core scenario, each respective code sample of the plurality of code samples corresponding to a respective programming language of a plurality of programming languages;
   deriving the API from the core scenario responsive to the plurality of code samples, wherein the deriving comprises producing a two-layer framework that includes component types targeting a relatively higher level of abstraction and component types targeting a relatively lower level of abstraction, wherein the relatively lower level of abstraction is lower in abstraction than the relatively higher level of abstraction; wherein the component types targeting the relatively higher level of abstraction are directed to core scenarios; and wherein the component types targeting the relatively lower level of abstraction provide a relatively greater amount of control to developers as compared to the component types targeting the relatively higher level of abstraction, which provide a relatively lower amount of control to the component types, wherein the relatively lower amount of control is a lower amount of control than the relatively greater amount of control;
   performing one or more usability studies on the API utilizing a plurality of developers, wherein the one or more usability studies comprise:
      determining, by an API designer, whether the plurality of developers are able to use the API without problems; and
      when the plurality of developers are determined not to be able to use the API without problems, then revising, by the API designer, the API based on the one or more usability studies to produce a revised API; and
   realizing the API in one or more processor-accessible storage media.

2. The method as recited in claim 1, further comprising:
   determining, by the API designer, if the API is more complex than desired.

3. The method as recited in claim 2, further comprising:
   if the API is determined to be more complex than desired, then
      refining, by the API designer, the API to produce a refined API.

4. The method as recited in claim 3, further comprising:
   determining, by the API designer, if the refined API is more complex than desired.

5. The method as recited in claim 1, wherein the performing comprises:
   performing the one or more usability studies on the API utilizing the plurality of developers wherein the plurality of developers are competent with the plurality of programming languages.

6. The method as recited in claim 1, wherein the deriving comprises:
   deriving the API to support the plurality of code samples that correspond respectively to the plurality of programming languages.

7. The method as recited in claim 1, wherein the deriving comprises:
   gleaning language-specific mandates from the plurality of code samples; and
   incorporating the language-specific mandates into the API.

8. The method as recited in claim 1, wherein the deriving comprises:
gleaning language-inspired developer expectations from the plurality of code samples; and
incorporating the language-inspired developer expectations into the API.

9. The method as recited in claim 1, wherein the deriving comprises:
gleaning commonalities from the plurality of code samples; and
incorporating the commonalities into the API.

10. The method as recited in claim 1, wherein the deriving comprises:
deriving the API to have an aggregate component that ties a plurality of lower-level factored types together to support the core scenario.

11. A method for designing an Application Programming Interface (API), the method comprising:
selecting a core scenario for a feature area;
writing at least one code sample for the core scenario;
deriving an API for the core scenario responsive to the at least one code sample, wherein the deriving comprises producing a two-layer framework that includes component types targeting a relatively higher level of abstraction and component types targeting a relatively lower level of abstraction, wherein the relatively lower level of abstraction is lower in abstraction than the relatively higher level of abstraction; wherein the component types targeting the relatively higher level of abstraction are directed to core scenarios; and wherein the component types targeting the relatively lower level of abstraction provide a relatively greater amount of control to developers as compared to the component types targeting the relatively higher level of abstraction, which provide a relatively lower amount of control to the component types, wherein the relatively lower amount of control is a lower amount of control than the relatively greater amount of control;
performing one or more usability studies on the API utilizing a plurality of developers, wherein the one or more usability studies comprise:
determining, by an API designer, whether the plurality of developers are able to use the API without problems; and
when the plurality of developers are determined not to be able to use the API without problems, then revising, by the API designer, the API based on the one or more usability studies to produce a revised API; and
realizing the API in one or more processor-accessible storage media.

12. The method as recited in claim 11, wherein the selecting comprises:
selecting a plurality of core scenarios for the feature area.

13. The method as recited in claim 12, further comprising:
repeating the writing and the deriving for each core scenario of the plurality of core scenarios that are selected for the feature area.

14. The method as recited in claim 11, wherein the writing comprises:
writing a plurality of code samples for the core scenario, each respective code sample of the plurality of code samples corresponding to a respective programming language of a plurality of programming languages.

15. The method as recited in claim 14, wherein the deriving comprises:
deriving the API for the core scenario responsive to the plurality of code samples.

16. The method as recited in claim 11, further comprising:
repeating the performing and the determining with respect to the revised API.

17. The method as recited in claim 11, wherein the deriving comprises:
deriving the API to support the at least one code sample written for the core scenario by producing a two-layer API that includes an aggregate component and a plurality of underlying factored types.

18. The method as recited in claim 11, wherein the deriving comprises:
gleaning one or more language-specific mandates from the at least one code sample; and
incorporating the one or more language-specific mandates into the API.

19. The method as recited in claim 11, wherein the deriving comprises:
encapsulating a particular factored type into an aggregate component that is associated with the core scenario if all members of the particular factored type are exposed by the aggregate component.

20. The method as recited in claim 11, wherein the deriving comprises:
encapsulating a particular factored type into an aggregate component that is associated with the core scenario if the particular factored type is independently unrelated to other component types.

21. The method as recited in claim 11, wherein the deriving comprises:
exposing a particular factored type from an aggregate component that is associated with the core scenario if at least one member of the particular factored type is not exposed by the aggregate component.

22. The method as recited in claim 11, wherein the deriving comprises:
exposing a particular factored type from an aggregate component that is associated with the core scenario if the particular factored type can be beneficially used independently of the aggregate component by another component type.

23. The method as recited in claim 11, wherein the deriving comprises:
deriving the API so as to enable a developer to implement a create-set-call usage pattern for the core scenario.

24. The method as recited in claim 23, wherein the deriving comprises:
producing the API with pre-selected parameters that are appropriate for the core scenario.

25. A method for designing an Application Programming Interface (API), the method comprising:
deriving an API for a scenario responsive to at least one code sample written with regard to the scenario, wherein the deriving comprises producing a two-layer framework that includes component types targeting a relatively higher level of abstraction and component types targeting a relatively lower level of abstraction, wherein the relatively lower level of abstraction is lower in abstraction than the relatively higher level of abstraction; wherein the component types targeting the relatively higher level of abstraction are directed to core scenarios; and wherein the component types targeting the relatively lower level of abstraction provide a relatively greater amount of control to developers as compared to the component types targeting the relatively higher level of abstraction, which provide a relatively lower amount of control to the component types, wherein the relatively lower amount of control is a lower amount of control than the relatively greater amount of control;
performing one or more usability studies on the API utilizing a plurality of developers, wherein the one or more usability studies comprise:
  determining, by an API designer, whether the plurality of developers are able to use the API without problems; and
  when the plurality of developers are determined not to be able to use the API without problems, then revising, by the API designer, the API based on the one or more usability studies to produce a revised API; and
realizing the API in one or more processor-accessible storage media.

26. The method as recited in claim 25, further comprising:
writing a plurality of code samples with regard to the scenario, each respective code sample of the plurality of code samples corresponding to a respective programming language of a plurality of programming languages;
wherein the deriving comprises:
  deriving the API for the scenario responsive to the plurality of code samples.

27. The method as recited in claim 25, further comprising, prior to the performing one or more usability studies on the API:
determining, by the API designer, if the API is more complex than desired;
if the API is determined to be more complex than desired, then
  refining, by the API designer, the API to produce a refined API; and
  determining, by the API designer, if the refined API is more complex than desired.

28. The method as recited in claim 25, further comprising:
repeating at least the performing and the determining with respect to the revised API.

29. The method as recited in claim 25, wherein the determining comprises:
determining whether the plurality of developers are able to use the API without problems with regard to a desired level of usability for at least one targeted developer group, wherein the desired level of usability includes considerations with respect to (i) frequent and/or extensive reference to detailed API documentation by the plurality of developers, (ii) a failure of a majority of the plurality of developers to implement the scenario, and (iii) whether the plurality of developers take an approach that is different from what is expected by the API designer.

30. The method as recited in claim 25, further comprising:
selecting a plurality of core scenarios for a feature area; and
repeating the deriving, the performing, and the revising for each core scenario of the plurality of core scenarios.

31. The method as recited in claim 30, wherein the deriving comprises:
producing an aggregate component for each core scenario of the plurality of core scenarios.

32. The method as recited in claim 25, wherein the deriving comprises:
producing an aggregate component that has a respective relationship with each respective factored type of a plurality of factored types.

33. The method as recited in claim 32, wherein the producing comprises:
producing the aggregate component to support the scenario for which the at least one code sample is written.

34. The method as recited in claim 32, wherein the producing comprises:
producing the aggregate component to have an exposed relationship with at least one factored type of the plurality of factored types and an encapsulated relationship with at least one other factored type of the plurality of factored types.

35. The method as recited in claim 34, wherein the at least one other factored type of the plurality of factored types that has the encapsulated relationship with the aggregate component can be handed off by the aggregate component for direct interaction with another component type.

36. The method as recited in claim 32, wherein the plurality of factored types are designed using an object-oriented methodology.

37. A method for designing an Application Programming Interface (API), the method comprising:
preparing a plurality of code samples for a core scenario, each respective code sample of the plurality of code samples corresponding to a respective programming language of a plurality of programming languages;
deriving the API for the core scenario responsive to the plurality of code samples, wherein the deriving comprises producing a two-layer framework that includes component types targeting a relatively higher level of abstraction and component types targeting a relatively lower level of abstraction, wherein the relatively lower level of abstraction is lower in abstraction than the relatively higher level of abstraction; wherein the component types targeting the relatively higher level of abstraction are directed to core scenarios; and wherein the component types targeting the relatively lower level of abstraction provide a relatively greater amount of control to developers as compared to the component types targeting the relatively higher level of abstraction, which provide a relatively lower amount of control to the component types, wherein the relatively lower amount of control is a lower amount of control than the relatively greater amount of control;
performing one or more usability studies on the API utilizing a plurality of developers, wherein the one or more usability studies comprise:
  determining, by an API designer, whether the plurality of developers are able to use the API without problems; and
  when the plurality of developers are determined not to be able to use the API without problems, then revising, by the API designer, the API based on the one or more usability studies to produce a revised API; and
realizing the API in one or more processor-accessible storage media.

38. A method for designing an Application Programming Interface (API), the method comprising:
writing at least one code sample for a scenario;
deriving an API for the scenario responsive to the at least one code sample, the API including (i) an aggregate component that is adapted to facilitate implementation of the scenario and (ii) a plurality of factored types that provide underlying functionality for the aggregate component, the API enabling a progression from using the aggregate component in simpler situations to using an increasing portion of the plurality of factored types in increasingly complex situations, wherein the simpler situations are less complex than the increasingly complex situations; wherein the deriving comprises producing a two-layer framework that includes component types targeting a relatively higher level of abstraction and component types targeting a relatively lower level of abstraction, wherein the relatively lower level of abstraction is lower in abstraction than the relatively higher level of abstraction; wherein the component types targeting the relatively higher level of abstraction are directed to core scenarios; and wherein the component types targeting the relatively lower level of abstraction provide a relatively greater amount of control to developers as compared to the component types targeting the relatively higher level of abstraction, which provide a relatively lower amount of control to the component types, wherein the relatively lower amount of control is a lower amount of control than the relatively greater amount of control;

performing one or more usability studies on the API utilizing a plurality of developers, wherein the one or more usability studies comprise:

determining, by an API designer, whether the plurality of developers are able to use the API without problems; and when the plurality of developers are determined not to be able to use the API without problems, then revising, by the API designer, the API based on the one or more usability studies to produce a revised API; and realizing the API in one or more processor-accessible storage media.

39. A method for designing an Application Programming Interface (API), the method comprising:

deriving at least one aggregate component to support at least one code sample for at least one scenario, wherein the deriving comprises producing a two-layer framework that includes component types targeting a relatively higher level of abstraction and component types targeting a relatively lower level of abstraction, wherein the relatively lower level of abstraction is lower in abstraction than the relatively higher level of abstraction; wherein the component types targeting the relatively higher level of abstraction are directed to core scenarios; and wherein the component types targeting the relatively lower level of abstraction provide a relatively greater amount of control to developers as compared to the component types targeting the relatively higher level of abstraction, which provide a relatively lower amount of control to the component types, wherein the relatively lower amount of control is a lower amount of control than the relatively greater amount of control;

determining additional requirements with respect to the at least one scenario;

deciding if the additional requirements can be added to the at least one aggregate component without adding more complexity than desired to the at least one scenario;

if it is decided that the additional requirements can not be added to the at least one aggregate component without adding more complexity than desired to the at least one scenario, then:

defining a plurality of factored types responsive to the deciding;

performing one or more usability studies on the at least one aggregate component utilizing a plurality of developers, wherein the one or more usability studies comprise:

determining, by an API designer, whether the plurality of developers are able to use the at least one aggregate component without problems; and when the plurality of developers are determined not to be able to use the at least one aggregate component without problems, then revising, by the API designer, the at least one aggregate component based on the one or more usability studies to produce a revised aggregate component; and realizing the at least one aggregate component in one or more processor-accessible storage media; and realizing the plurality of factored types in the one or more processor-accessible storage media; and if it is decided that the additional requirements can be added to the at least one aggregate component without adding more complexity than desired to the at least one scenario, then:

refining the at least one aggregate component to incorporate the additional requirements;

performing one or more usability studies on the refined at least one aggregate component utilizing a plurality of developers, wherein the one or more usability studies comprise:

determining, by an API designer, whether the plurality of developers are able to use the refined at least one aggregate component without problems; and when the plurality of developers are determined not to be able to use the refined at least one aggregate component without problems, then revising, by the API designer, the refined at least one aggregate component based on the one or more usability studies to produce a revised aggregate component; and realizing the refined at least one aggregate component in the one or more processor-accessible storage media.

40. The method as recited in claim 39, further comprising:
selecting a plurality of core scenarios for a feature area, the plurality of core scenarios including the at least one scenario; and writing a plurality of code samples showing preferred lines of code for the plurality of core scenarios, the plurality of code samples including the at least one code sample;

wherein the deriving comprises:
deriving a plurality of aggregate components, which include the at least one aggregate component, to support the plurality of code samples for the plurality of core scenarios.

41. The method as recited in claim 39, wherein the deriving comprises:
deriving the at least one aggregate component with methods, defaults, and abstractions to support the at least one code sample for the at least one scenario.

42. The method as recited in claim 39, further comprising:
refining the at least one code sample according to the at least one derived aggregate component;
evaluating the refined at least one code sample with regard to simplicity; and
repeating the deriving if the refined at least one code sample fails to be as simple as desired as determined in the evaluating.

43. The method as recited in claim 39, wherein the determining comprises:
determining additional requirements with respect to the at least one scenario, wherein the additional requirements include additional scenarios, additional usages, and additional interactions with other component types.

44. The method as recited in claim 39, wherein the deciding comprises:
considering whether adding the additional requirements to the at least one aggregate component hinders a create-set-call usage pattern.

45. The method as recited in claim 39, wherein the defining comprises:

defining the plurality of factored types responsive to the deciding with a factoring of a full set of functionality.

46. The method as recited in claim 39, wherein the defining comprises:

defining the plurality of factored types responsive to the deciding using one or more object-oriented methodologies.

47. The method as recited in claim 39, further comprising: determining whether the at least one aggregate component is to encapsulate or expose the functionality of each factored type of the plurality of factored types.

48. The method as recited in claim 39, further comprising: refining the plurality of factored types to support the at least one aggregate component and the additional requirements.

* * * * *